United States Patent
Zhou et al.

(10) Patent No.: US 11,438,792 B2
(45) Date of Patent: Sep. 6, 2022

(54) DEVICES AND METHODS FOR MANAGING COMMUNICATION IN A V2X COMMUNICATION NETWORK

(71) Applicant: HUAWEI TECHNOLOGIES CO., LTD., Guangdong (CN)

(72) Inventors: Chan Zhou, Munich (DE); Serkan Ayaz, Munich (DE); Ke Zhang, Chengdu (CN); Fan Wu, Chengdu (CN); Supeng Leng, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 16/928,146

(22) Filed: Jul. 14, 2020

(65) Prior Publication Data

US 2020/0344643 A1 Oct. 29, 2020

Related U.S. Application Data

(63) Continuation of application No. PCT/EP2018/050857, filed on Jan. 15, 2018.

(51) Int. Cl.
*H04W 28/08* (2009.01)
*H04W 28/02* (2009.01)
(Continued)

(52) U.S. Cl.
CPC ......... *H04W 28/0289* (2013.01); *H04W 4/46* (2018.02); *H04W 4/80* (2018.02); *H04W 28/0226* (2013.01); *H04W 76/14* (2018.02)

(58) Field of Classification Search
CPC .... H04L 47/14; H04L 67/12; H04W 28/0289; H04W 4/46; H04W 4/80; H04W 28/0226; H04W 76/14; H04W 4/40; H04W 28/0231

See application file for complete search history.

(56) References Cited

U.S. PATENT DOCUMENTS

2018/0242190 A1* 8/2018 Khoryaev ......... H04W 28/0289
2019/0116475 A1* 4/2019 Lee .................... H04W 4/40
(Continued)

FOREIGN PATENT DOCUMENTS

EP 3253085 A1 * 12/2017 ............ H04W 28/02
EP 3253085 A1 12/2017
(Continued)

OTHER PUBLICATIONS

3GPP TS 36.300 V15.0.0 (Dec. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Dec. 2017. total 338 pages.
(Continued)

*Primary Examiner* — Benjamin H Elliott, IV

(57) ABSTRACT

The present application relates to a global communication management entity for managing vehicle-to-everything (V2X) communication parameters of a plurality of vehicular user equipments of a V2X communication network, the corresponding V2X communication network and vehicular user equipment. The global communication management entity comprises at least one processor and a memory configured to store computer readable instructions that, when executed by the at least one processor, cause the global communication management entity to provide execution comprising determining one or more V2X communication parameters of a vehicular user equipment of the plurality of vehicular user equipments, wherein the one or more V2X communication parameters are associated with a local vehicle-to-vehicle (V2V) congestion control scheme implemented on the vehicular user equipment and/or a V2V communication module of the vehicular user equipment for communicating with the other vehicular user equipments;
(Continued)

and providing the one or more V2X communication parameters to the vehicular user equipment.

18 Claims, 16 Drawing Sheets

(51) Int. Cl.
    *H04W 4/46*           (2018.01)
    *H04W 76/14*         (2018.01)
    *H04W 4/80*           (2018.01)

(56) References Cited

U.S. PATENT DOCUMENTS

2020/0137539 A1* 4/2020 Brahmi ............. H04W 74/0816
2020/0296795 A1* 9/2020 Uchiyama .......... H04B 7/15528
2020/0344643 A1* 10/2020 Zhou ....................... H04L 47/14

FOREIGN PATENT DOCUMENTS

WO         2017052488 A1     3/2017
WO         2017052690 A1     3/2017
WO     WO-2017052488 A1 *     3/2017   ....... G08G 1/096716

OTHER PUBLICATIONS

3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC); Protocol specification (Release 15), Jan. 2018. total 776 pages.
ETSI TS 102 687 V1.1.1 (Jul. 2011), Intelligent Transport Systems (ITS); Decentralized Congestion Control Mechanisms for Intelligent Transport Systems operating in the 5 GHz range; Access layer part, total 45 pages.
ETSI TR 101 612 V1.1.1 (Sep. 2014), Intelligent Transport Systems (ITS); Cross Layer DCC Management Entity for operation in the ITS G5A and ITS G5B medium; Report on Cross layer DCC algorithms and performance evaluation, Sep. 2014. total 57 pages.
ETSI TS 103 175 V1.1.1 (Jun. 2015), Intelligent Transport Systems (ITS); Cross Layer DCC Management Entity for operation in the ITS G5A and ITS G5B medium. Jun. 2015. total 36 pages.
ETSI TS 102 724 V1.1.1 (Oct. 2012), Intelligent Transport Systems (ITS); Harmonized Channel Specifications for Intelligent Transport Systems operating in the 5 GHz frequency band, Oct. 2012. total 31 pages.
IEEE 802.11-2012 IEEE Standard for Information technology; Telecommunications and information exchange between systems; Local and metropolitan area networks; Specific requirements; Part 11: Wireless LAN Medium Access Control (MAC) and Physical Layer (PHY) Specifications, IEEE Computer Society, dated Mar. 29, 2012, total 2793 pages.
IEEE Std 802.11p-2010, IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 6: Wireless Access in Vehicular Environments, IEEE Computer Society, Jul. 15, 2010, 51 pages.
ETSI EN 302 663 V1.2.1 (May 2013), Intelligent Transport Systems (ITS); Access layer specification for Intelligent Transport Systems operating in the 5 GHz frequency band, May 2013. total 24 pages.
IEEE Std 802.11-2007, IEEE Standard for Information technology—Telecommunications and information exchange between systems—Local and metropolitan area networks—Specific requirements Part 11: Wireless LAN Medium Access Control (MAC) and Physical Layer (PHY) Specifications, Jun. 12, 2007, 1232 pages.
ETSI ES 202 663 V1.1.0 (Nov. 2009), Intelligent Transport Systems (ITS); European profile standard for the physical and medium access control layer of Intelligent Transport Systems operating in the 5 GHz frequency band, Nov. 2009. total 27 pages.
ETSI TS 102 636-4-2 V1.1.1 (Oct. 2013), Intelligent Transport Systems (ITS); Vehicular Communications; GeoNetworking; Part 4: Geographical addressing and forwarding for point-to-point and point-to-multipoint communications; Sub-part 2: Media-dependent functionalities for ITS-G5, Oct. 2013. total 25 pages.
ETSI TS 102 723-1 V1.1.1 (Nov. 2012), Intelligent Transport Systems (ITS); OSI cross-layer topics; Part 1: Architecture and addressing schemes, Nov. 2012. total 11 pages.
International Search Report and Written Opinion issued in PCT/EP2018/050857, dated Sep. 20, 2018. total 10 pages.
IEEE Std 1609.4-2016, IEEE Standard for Wireless Access in Vehicular Environments (WAVE)—Multi-Channel Operation, Mar. 21, 2016, total 94 pages.
IEEE Std 802.1D-2004, IEEE Standard for Local and metropolitan area networks Media Access Control (MAC) Bridges, Jun. 9, 2004, total 281 pages.

* cited by examiner

Algorithm: *The centralized control algorithm*

Input: vehicular state information, global traffic information of the streets and highways from TMCs, road situation, interference, shadow area.

Output: $CBR_j$, $CBR_{ref}$, DCC Parameters (TPC, TRC, TDC, DSC, TAC), Multi-Channel operation parameter settings, IEEE 802.11p parameters (e.g., $Cwmin$, $Cwmax$), transmission mode (V2V,V2I) selection, scheduled radio resource allocations dedicated to single or a group of vehicles, new transmission parameters for new radio technology 1. According to the road situation especially road lanes, and the location of vehicles, the network node divides the vehicle into different spatial groups according to the intensive degree $\rho$.

2. The network node estimates individual CBR values of each vehicle ($CBR_j$) and group CBR ($CBR_{ref}$) and the wireless channel state of the vehicles in each group.

3. The network node decides on the control parameters of the vehicles of the corresponding spatial group and delivers the output.

Fig. 13

DEVICES AND METHODS FOR MANAGING COMMUNICATION IN A V2X COMMUNICATION NETWORK

CROSS-REFERENCE TO RELATED APPLICATIONS

This application is a continuation of International Application No. PCT/EP2018/050857, filed on Jan. 15, 2018, the disclosure of which is hereby incorporated by reference in its entirety.

TECHNICAL FIELD

In general, the present disclosure relates to the field of wireless communication. In particular, the present disclosure relates to devices and methods for managing communication in a vehicle-to-everything (V2X) communication network.

BACKGROUND

V2X (vehicle-to-everything) communication networks allow the exchange of information, in particular, between vehicular user equipments, road side units (RSUs), base stations and V2X communication management servers located, for instance, in the cloud. The direct communication between vehicular user equipments, generally referred to as vehicle-to-vehicle (V2V) communication, can be implemented using different, often standardized communication technologies, such as dedicated short range communications (DSRC), in particular communication technologies based on IEEE 802.11p, and/or sidelink communication technologies, in particular, LTE-Vehicular (LTE-V).

In IEEE 802.11p, channel congestion and the wireless channel characteristics are two main challenges that affect transmission performance (e.g., packet delivery ratio (PDR)) among vehicles. Most of the emerging applications for road safety and traffic management rely on the frequent exchange of Intelligent Transportation Systems (ITS) messages (e.g., Cooperative Awareness Message (CAM), Decentralized Environmental Notification Message (DENM)) among vehicles. The performance of IEEE 802.11p, however, degrades under congested scenarios and cannot guarantee the reliability and timeliness demands of massively transmitted broadcast messages, leading to severe degradation of safety. It is well known that the performance of the IEEE 802.11p protocol for inter-vehicular communication heavily degrades as the network load increases. Congestion on the communication channel decreases the packet delivery ratio (PDR), and makes it difficult for a vehicle to recognize potentially dangerous situations in its vicinity.

Also wireless channel characteristics such as the interference and shadow effect affect the transmission performance. Unless controlled, congestion increases with vehicle density and the changes of wireless channel characteristics, leading to high packet loss and a degrading safety application performance.

In order to control the network congestion to remain at an acceptable level, the European Telecommunications Standards Institute (ETSI) Intelligent Transport Systems (ITS) introduced a scheme called decentralized congestion control (DCC) running together with IEEE 802.11p radio technology. DCC locally adapts different transmission parameters of a vehicle to keep the channel load below pre-defined thresholds. Furthermore, the 3rd Generation Partnership Project (3GPP) has standardized a new set of protocols (referred to as "V2X sidelink communication" in Release 14) that will be used by vehicles for direct, i.e. V2V communication in addition to the IEEE 802.11p standard.

The addition of DCC on top of IEEE 802.11p (DSRC) may provide some additional gains but still may lead to the following problems in IEEE 802.11p-based vehicular ad hoc networks. DCC as a local, i.e. decentralized congestion control algorithm cannot obtain any global information in order to make optimum adjustments on V2X communication parameters on short time scales. This may cause a problem in some traffic scenarios (e.g., at traffic intersections) which require a faster global adaptation of V2X communication parameters of vehicles in case the geographical region is congested. Moreover, sudden wireless channel changes of the V2V communication channel due to, for instance, interference and the shadowing effect caused by either roadside buildings or the mobility of the vehicular user equipments will have a negative impact on the communication performance. The same disadvantages can also hold for the congestion control mechanism implemented for 3GPP V2X sidelink communication.

Thus, there is a need for improved devices and methods for managing V2X communication parameters of vehicular user equipments in a V2X communication network.

SUMMARY

It is an object of the present disclosure to provide improved devices and methods for managing V2X communication parameters of vehicular user equipments in a V2X communication network.

The foregoing and other objects are achieved by the subject matter of the independent claims. Further implementation forms are apparent from the dependent claims, the description and the figures.

According to a first aspect the invention relates to a global communication management entity for managing V2X communication parameters of a plurality of vehicular user equipments of a V2X communication network. The global communication management entity comprises: a processor configured to determine one or more V2X communication parameters of a vehicular user equipment of the plurality of vehicular user equipments, wherein the one or more V2X communication parameters are associated with a local V2V congestion control scheme implemented on the vehicular user equipment and/or a V2V communication module of the vehicular user equipment for communicating with the other vehicular user equipments; and a communication module configured to provide the one or more V2X communication parameters to the vehicular user equipment.

Thus, an improved device for managing V2X communication parameters of vehicular user equipments in a V2X communication network is provided.

In a further possible implementation form of the first aspect, the processor is configured to determine one or more V2X communication parameters of a vehicular user equipment of the plurality of vehicular user equipments on the basis of information about a respective motion state of the plurality of vehicular user equipments.

In a further possible implementation form of the first aspect, the respective motion state of the plurality of vehicular user equipments comprises one or more of the following for each vehicular user equipment: a location of the vehicular user equipment, a velocity of the vehicular user equipment, a motion direction of the vehicular user equipment, a planned route of the vehicular user equipment.

In a further possible implementation form of the first aspect, the one or more V2X communication parameters are associated with a V2V communication module in the form of a dedicated short-range communications (DSRC) module, in particular a V2V communication module based on IEEE 802.11p, and/or the one or more V2X communication parameters are associated with a V2V communication module in the form of a sidelink communications module, in particular a V2V communication module based on LTE-V.

In a further possible implementation form of the first aspect, the V2X communication parameters further comprise one or more of the following parameters of the vehicular user equipment: frequency and multi-channel operation parameters [IEEE 1609.4-2016], channel access time parameters, in particular transmission inhibition period [ARIB STD-T109], scheduled transmission parameters, V2X communication mode selection parameters and/or message generation rate of an application belonging to a traffic class [ETSI TS 103 141].

In a further possible implementation form of the first aspect, the global communication management entity is further configured to manage infrastructure-to-vehicle (I2V) communication parameters of a plurality of roadside units (RSUs) of the V2X communication network, wherein the processor is configured to determine one or more I2V communication parameters of a RSU of the plurality of RSUs on the basis information about a respective motion state of the plurality of vehicular user equipments.

In a further possible implementation form of the first aspect, the one or more I2V communication parameters comprise one or more of the following parameters of the RSU: frequency and multi-channel operation parameters [IEEE 1609.4-2016], channel access time parameters, in particular transmission inhibition period [ARIB STD-T109], scheduled transmission parameters, I2V communication mode selection parameters and message generation rate of an application belonging to a traffic class [ET& TS 103 141].

In a further possible implementation form of the first aspect, the local V2V congestion control scheme implemented on the vehicular user equipment is operated in an active operation mode or an inactive operation mode, wherein the processor of the global communication management entity is configured to adjust the operation mode of the local V2V congestion control scheme implemented on the vehicular user equipment.

In a further possible implementation form of the first aspect, the active operation mode is associated with a first set of V2X communication parameters, wherein the inactive operation mode is associated with a second set of V2X communication parameters and a state machine of the local V2V congestion control scheme is deactivated.

In a further possible implementation form of the first aspect, the local V2V congestion control scheme implemented on the vehicular user equipment is associated with a state machine defining a plurality of states, including a "relaxed" state, an "active" state and/or a "restrictive" state, wherein in the active operation mode of the local V2V congestion control scheme implemented on the vehicular user equipment the processor of the vehicular user equipment is configured to adjust the state of the local V2V congestion control scheme implemented on the vehicular user equipment.

In a further possible implementation form of the first aspect, the local V2V congestion control scheme implemented on the vehicular user equipment is associated with a state machine defining a plurality of states, including a "relaxed" state, an "active" state and/or a "restrictive" state, wherein in the inactive operation mode of the local V2V congestion control scheme implemented on the vehicular user equipment the processor of the global communication management entity is configured to adjust the state of the local V2V congestion control scheme implemented on the vehicular user equipment.

In a further possible implementation form of the first aspect, each state of the state machine is associated with a different set of V2X communication parameters.

In a further possible implementation form of the first aspect, the local V2V congestion control scheme implemented on the vehicular user equipment is a local DCC scheme and the one or more V2X communication parameters comprise a transmit power control (TPC), a transmit rate control (TRC), a transmit datarate control (TDC), a DCC sensitivity control (DSC), and/or a transmit access control (TAC).

In a further possible implementation form of the first aspect, the local V2V congestion control scheme implemented on the vehicular user equipment is a local DCC scheme and the local DCC scheme is a reactive local DCC scheme or an adaptive local DCC scheme according to ETSI TR 101 612.

In a further possible implementation form of the first aspect, the local V2V congestion control scheme implemented on the vehicular user equipment is a local sidelink communication, in particular a LTE-V, congestion control scheme and the one or more V2X communication parameters comprise a maximum transmission power, a range of the number of retransmissions per transport block, a range of the Physical Sidelink Shared Channel (PSSCH) resource block (RB) number, a modulation and coding scheme (MCS) range and/or a maximum limit on a channel occupancy ratio.

In a further possible implementation form of the first aspect, the one or more V2X communication parameters comprise a global channel busy ratio (CBR), and/or a global received signal strength indication (RSSI), associated with the V2V communication module and wherein the communication module is configured to provide the global CBR and/or the global RSSI to the vehicular user equipment.

In a further possible implementation form of the first aspect, the vehicular user equipment is configured to determine a local CBR and/or a local RSSI associated with the V2V communication module and to adjust the one or more V2X communication parameters of the vehicular user equipment on the basis of the local CBR and/or the local RSSI.

In a further possible implementation form of the first aspect, the communication module is configured to receive from the plurality of vehicular user equipments a respective local CBR and/or a respective local RSSI associated with the V2V communication module of the respective vehicular user equipment, wherein the processor is configured to determine the one or more V2X communication parameters of a vehicular user equipment of the plurality of vehicular user equipments on the basis of the respective local RSSI associated with the V2V communication module of the plurality of vehicular user equipments.

According to a second aspect the invention relates to a V2X communication network comprising a plurality of vehicular user equipments and a global communication management entity for managing V2X communication parameters of the plurality of vehicular user equipments according to the first aspect of the invention.

In a further possible implementation form of the second aspect, the V2X communication network further comprises a plurality of RSUs and wherein the global communication management entity is configured to manage I2V communication parameters of the plurality of RSUs.

In a further possible implementation form of the second aspect, the global communication management entity is implemented on one or more servers of the V2X communication network.

According to a third aspect the invention relates to a vehicular user equipment of a V2X communication network, wherein the vehicular user equipment comprises: a processor configured to implement a local V2V congestion control scheme; a V2V communication module for communicating with other vehicular user equipments of the V2X communication network; and a communication module for communicating with a global communication management entity; wherein the vehicular user equipment is configured to receive from a global management entity one or more V2X communication parameters, wherein the one or more V2X communication parameters are associated with the local V2V congestion control scheme implemented on the vehicular user equipment and/or the V2V communication module of the vehicular user equipment for communicating with the other vehicular user equipments.

In a further possible implementation form of the third aspect, the one or more V2X communication parameters are based on a respective motion state of the vehicular user equipment and the other vehicular user equipments.

According to a fourth aspect the invention relates to a method for managing V2X communication parameters of a plurality of vehicular user equipments of a V2X communication network, wherein the method comprises the steps of: determining one or more V2X communication parameters of a vehicular user equipment of the plurality of vehicular user equipments, wherein the one or more V2X communication parameters are associated with a local V2V congestion control scheme implemented on the vehicular user equipment and/or a V2V communication module of the vehicular user equipment for communicating with the other vehicular user equipments; and providing the one or more V2X communication parameters to the vehicular user equipment.

Thus, an improved method for managing V2X communication parameters of vehicular user equipments in a V2X communication network is provided.

The method according to the fourth aspect of the invention can be performed by the global communication management entity according to the first aspect of the invention. Further features of the method according to the fourth aspect of the invention result directly from the functionality of the management entity according to the first aspect of the invention and its different implementation forms described above and below.

According to a fifth aspect, the invention relates to a computer program product comprising a program code for performing the method of the fourth aspect when executed on a computer or a processor.

The invention can be implemented in hardware and/or software.

BRIEF DESCRIPTION OF THE DRAWINGS

Further embodiments of the invention will be described with respect to the following figures, wherein:

FIG. 13 shows a schematic diagram illustrating an algorithm implemented in the global communication management entity according to an embodiment;

In the various figures, identical reference numbers will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
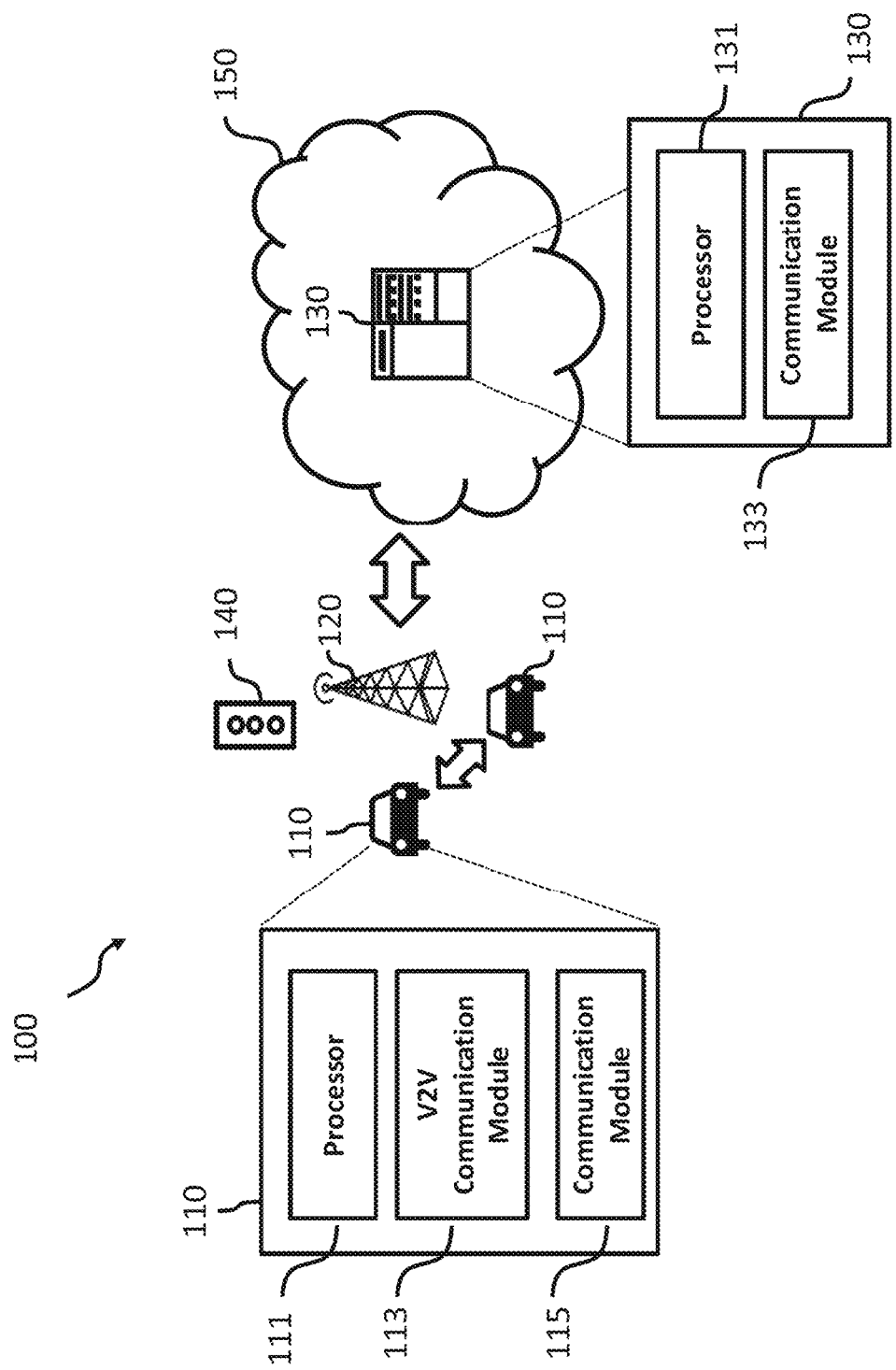
FIG. 1 shows a schematic diagram illustrating a V2X communication network comprising a global communication management entity and a plurality of vehicular user equipments according to an embodiment.

FIG. 1 shows a schematic diagram illustrating a V2X communication network 100 according to an embodiment.

In the embodiment shown in FIG. 1, the V2X communication network 100 comprises a plurality of vehicular user equipments 110 and a plurality of roadside units (RSUs) 140, such as smart traffic lights. As illustrated in FIG. 1, the plurality of vehicular user equipments 110 are configured to communicate directly with each other. To this end, each vehicular user equipment comprises a V2V communication module 113. As will be explained in more detail further below, the V2V communication module 113 of each vehicular user equipment 110 can be based on a dedicated short-range communications (DSRC) technology, such as IEEE 802.11p and/or a V2X sidelink communications technology, such as LTE-V.

Each vehicular user equipment 110 further comprises a processor 111 configured to implement a local V2V congestion control scheme for locally managing the V2V communication with neighboring vehicular user equipments.

Each vehicular user equipment 110 further comprises a communication module 115 for communicating with a global communication management entity 130 (which is also referred to as network node 130 herein). In the embodiment shown in FIG. 1, the global communication management entity 130 is implemented on one or more servers located in the cloud 150. In an embodiment, the communication between a vehicular user equipment 110 and the global communication management entity 130 can make use of a radio access network defined by a plurality of base stations 120 of a mobile communication network.

As will be described in more detail further below, the global communication management entity 130 is configured to manage V2X communication parameters of the plurality of vehicular user equipments 110 of the V2X communication network 100.

The global communication management entity 130 comprises a processor 131 configured to determine one or more V2X communication parameters of one or more vehicular user equipments of the plurality of vehicular user equipments 110, wherein the one or more V2X communication parameters are associated with the local V2V congestion control scheme implemented on the processor 111 of the vehicular user equipment 110 and/or the V2V communication module 113 of the vehicular user equipment 110 for communicating with the other vehicular user equipments 110.

Moreover, the global communication management entity 130 comprises a communication module 133 configured to provide the one or more V2X communication parameters to the one or more vehicular user equipments 110.

Figure 2:
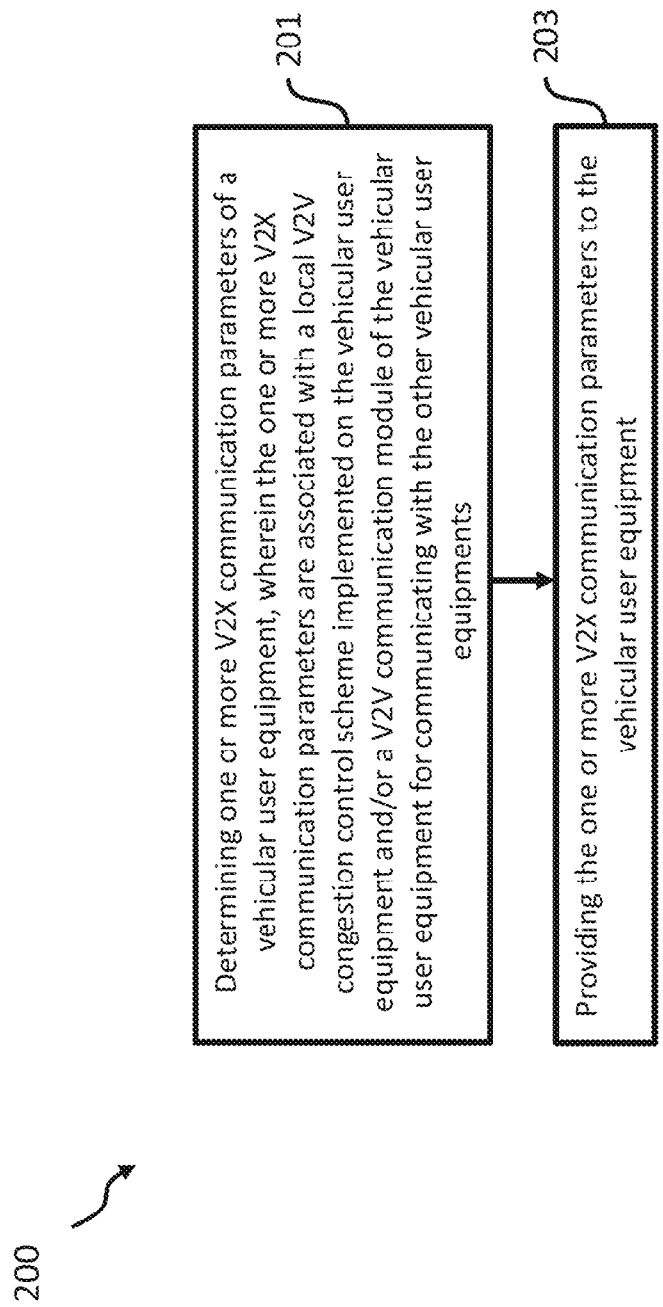
FIG. 2 shows a flow diagram illustrating steps of a method for managing V2X communication parameters of a plurality of vehicular user equipments of a V2X communication network according to an embodiment.

FIG. 2 shows a flow diagram illustrating the steps of a corresponding method 200 for managing V2X communication parameters of the plurality of vehicular user equipments 110 of the V2X communication network 100 according to an embodiment. The method 200 comprises the steps of: determining, at step 201, one or more V2X communication parameters of one or more vehicular user equipments 110 of the plurality of vehicular user equipments 110, wherein the one or more V2X communication parameters are associated with the local V2V congestion control scheme implemented on the processor 111 of the vehicular user equipment 110 and/or a V2V communication module 113 of the vehicular user equipment 110 for communicating with the other vehicular user equipments 110; and providing, at step 203, the one or more V2X communication parameters to the vehicular user equipment 110.

In the following further embodiments of the global communication management entity 130, the V2X communication network 100, the vehicular user equipments 110 and the method 200 will be described.

In an embodiment, the processor 131 of the global communication management entity 130 is configured to determine one or more V2X communication parameters of one or more vehicular user equipments of the plurality of vehicular user equipments 110 on the basis of information about a respective motion state of the plurality of vehicular user equipments 110. In an embodiment, the respective motion state of the plurality of vehicular user equipments 110 comprises one or more of the following for each vehicular user equipment 110: a location of the vehicular user equipment 110, a velocity of the vehicular user equipment 110, a motion direction of the vehicular user equipment 110, a planned route of the vehicular user equipment 110.

As already mentioned above, in an embodiment, the one or more V2X communication parameters can be associated with a V2V communication module 113 in the form of a dedicated short-range communications (DSRC) module and/or the one or more V2X communication parameters can be associated with a V2V communication module 113 in the form of a sidelink communications module.

In an embodiment, the V2X communication parameters further comprise one or more of the following parameters of the vehicular user equipment 110: frequency and multi-channel operation parameters [IEEE 1609.4-2016], channel access time parameters, in particular transmission inhibition period [ARIB STD-T109], scheduled transmission parameters, V2X communication mode selection parameters and/or message generation rate of an application belonging to a traffic class [ETSI TS 103 141].

In an embodiment, the global communication management entity 130 is further configured to manage infrastructure-to-vehicle (I2V) communication parameters of the plurality of roadside units (RSUs) 140 of the V2X communication network 100, wherein the processor 131 of the global communication management entity 130 is configured to determine one or more I2V communication parameters of a RSU 140 of the plurality of RSUs 140 on the basis of information about a respective motion state of the plurality of vehicular user equipments 110.

In an embodiment, the one or more I2V communication parameters comprise one or more of the following parameters of the RSU 140: frequency and multi-channel operation parameters [IEEE 1609.4-2016], channel access time parameters, in particular transmission inhibition period [ARIB STD-T109], scheduled transmission parameters, I2V communication mode selection parameters and message generation rate of an application belonging to a traffic class [ETSI TS 103 141].

In an embodiment, the local V2V congestion control scheme implemented on the vehicular user equipment 110 can be operated in an active operation mode or an inactive operation mode, wherein the processor 131 of the global communication management entity 130 is configured to adjust the operation mode of the local V2V congestion control scheme implemented on the vehicular user equipment 110.

In an embodiment, the active operation mode can be associated with a first set of V2X communication parameters, while the inactive operation mode can be associated with a different second set of V2X communication parameters and a state machine of the local V2V congestion control scheme can be deactivated.

Figure 3:
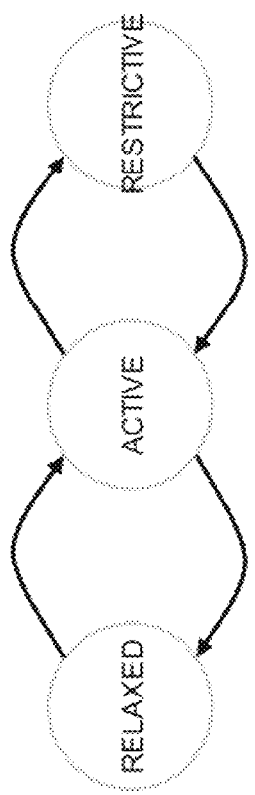
FIG. 3 shows a schematic diagram illustrating a state machine of a local congestion control scheme implemented in a vehicular user equipment according to an embodiment.

In an embodiment, the local V2V congestion control scheme implemented on the vehicular user equipment 110 is associated with a state machine defining a plurality of states, including a "relaxed" state, an "active" state and/or a "restrictive" state, wherein in the active operation mode of the local V2V congestion control scheme implemented on the vehicular user equipment 110, the processor 111 is configured to adjust the state of the local V2V congestion control scheme implemented on the vehicular user equipment 110. Such a state machine is illustrated in FIG. 3.

In an embodiment, the local V2V congestion control scheme implemented on the vehicular user equipment 110 is associated with a state machine defining a plurality of states, including a "relaxed" state, an "active" state and/or a "restrictive" state, wherein in the inactive operation mode of the local V2V congestion control scheme implemented on the vehicular user equipment 110, the processor 131 of the global communication management entity 130 is configured to adjust the state of the local V2V congestion control scheme implemented on the vehicular user equipment 110.

In an embodiment, each state of the state machine can be associated with a different set of V2X communication parameters.

In an embodiment, the local V2V congestion control scheme implemented on the vehicular user equipment 110 is a local DCC scheme, wherein the one or more V2X communication parameters comprise a transmit power control (TPC), a transmit rate control (TRC), a transmit datarate control (TDC), a DCC sensitivity control (DSC), and/or a transmit access control (TAC).

In an embodiment, the local DCC scheme can be a reactive local DCC scheme or an adaptive local DCC scheme as defined in the standard ETSI TR 101 612. The reactive approaches can work in different ways such as they may adjust the transmit rate or adjust DCC flow control filter to limit the contribution of a vehicle's packet to the channel load. The adaptive approaches can use binary control and linear control algorithms as described in ETSI TR 101 612.

In an embodiment, the local V2V congestion control scheme implemented on the vehicular user equipment 110 is a local sidelink communication, in particular a LTE-V, congestion control scheme, wherein the one or more V2X communication parameters comprise a maximum transmission power, a range of the number of retransmissions per transport block, a range of the PSSCH RB number, a MCS range and/or a maximum limit on a channel occupancy ratio.

In an embodiment, the one or more V2X communication parameters comprise a global channel busy ratio, CBR, and/or a global received signal strength indication, RSSI, associated with the V2V communication module 113 of the vehicular user equipment 110, wherein the communication module 133 of the global communication management entity 130 is configured to provide the global CBR and/or the global RSSI to the vehicular user equipment 110.

In an embodiment, the vehicular user equipment 110 can be configured to determine a local CBR and/or a local RSSI associated with the V2V communication module 113 and to adjust the one or more V2X communication parameters of the vehicular user equipment 110 on the basis of the local CBR and/or the local RSSI.

In an embodiment, the communication module 133 of the global communication management entity 130 is configured to receive from the plurality of vehicular user equipments 110 a respective local CBR and/or a respective local RSSI associated with the V2V communication module 113 of the respective vehicular user equipment 110, wherein the processor 131 of the global communication management entity 130 is configured to determine the one or more V2X communication parameters of a vehicular user equipment 110 of the plurality of vehicular user equipments 110 on the basis of information about a respective motion state of the plurality of vehicular user equipments 110 and the respective local CBR and/or the respective local RSSI associated with the respective V2V communication module 113 of the plurality of vehicular user equipments 110.

As already mentioned above, in an embodiment, the global communication management entity 130 is further configured to manage 12V communication parameters of the plurality of RSUs (140).

In an embodiment, the local V2V congestion control scheme implemented on the processor 111 of the vehicular user equipment is the decentralized congestion control (DCC) scheme introduced by the European Telecommunications Standards Institute (ETSI) Intelligent Transport Systems (ITS). In an embodiment, DCC requires components on several layers of the protocol stack and these components work together to keep the channel load below pre-defined thresholds and to provide fair allocation of resources among all ITS stations.

Figure 4:
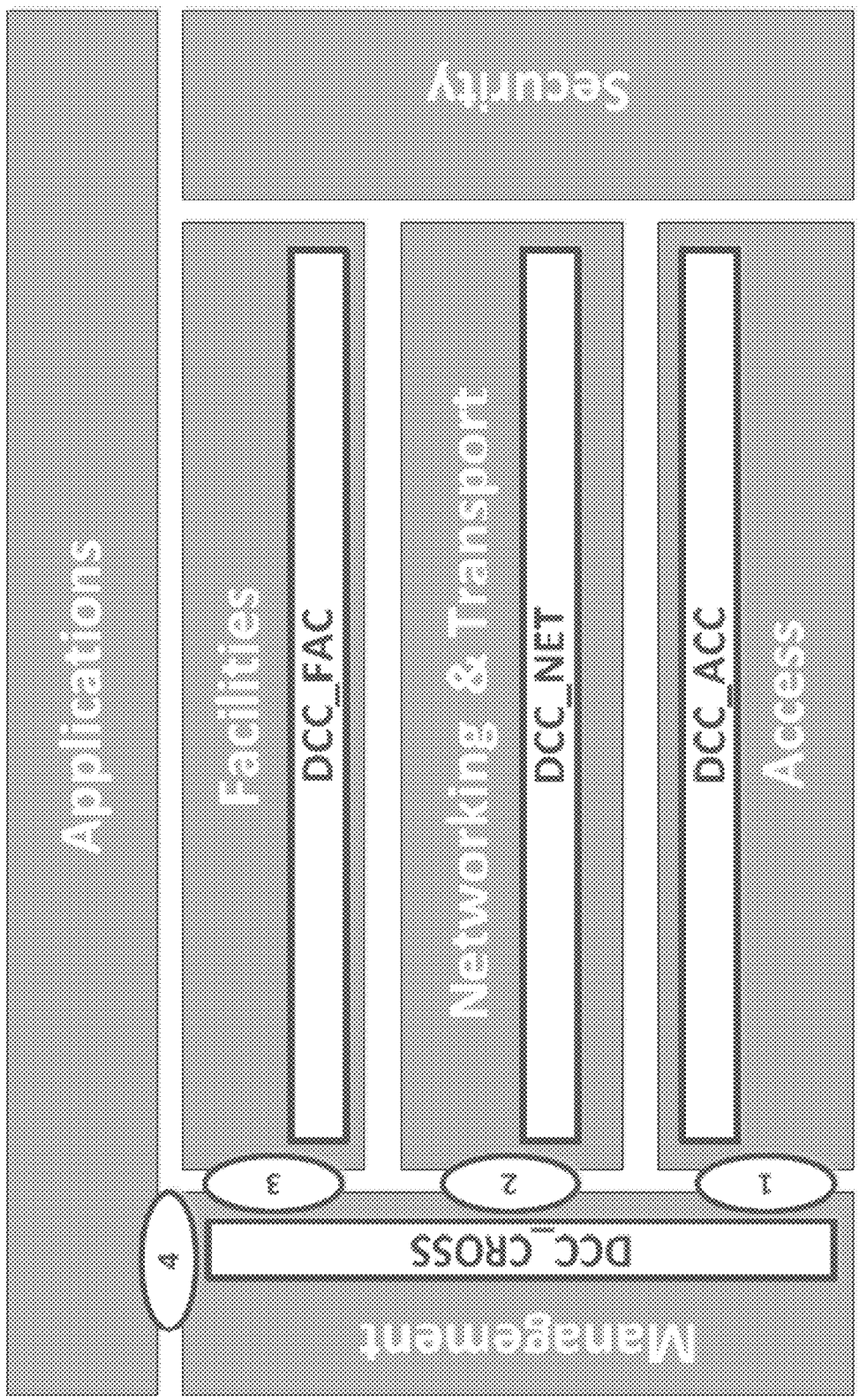
FIG. 4 shows a schematic diagram illustrating a local congestion control scheme implemented in a vehicular user equipment according to an embodiment.

An exemplary DCC architecture implemented in the processor 111 of the vehicular user equipment 110 according to an embodiment is shown in FIG. 4 and the components are connected through the DCC interfaces 1 to 4. It consists of the following DCC entities: DCC_CROSS (also known as DCC Management Entity) located in the management layer; DCC_ACC located in the access layer; DCC_NET located in the networking and transport layer and DCC_FAC located in the facility layer.

Figure 5A:
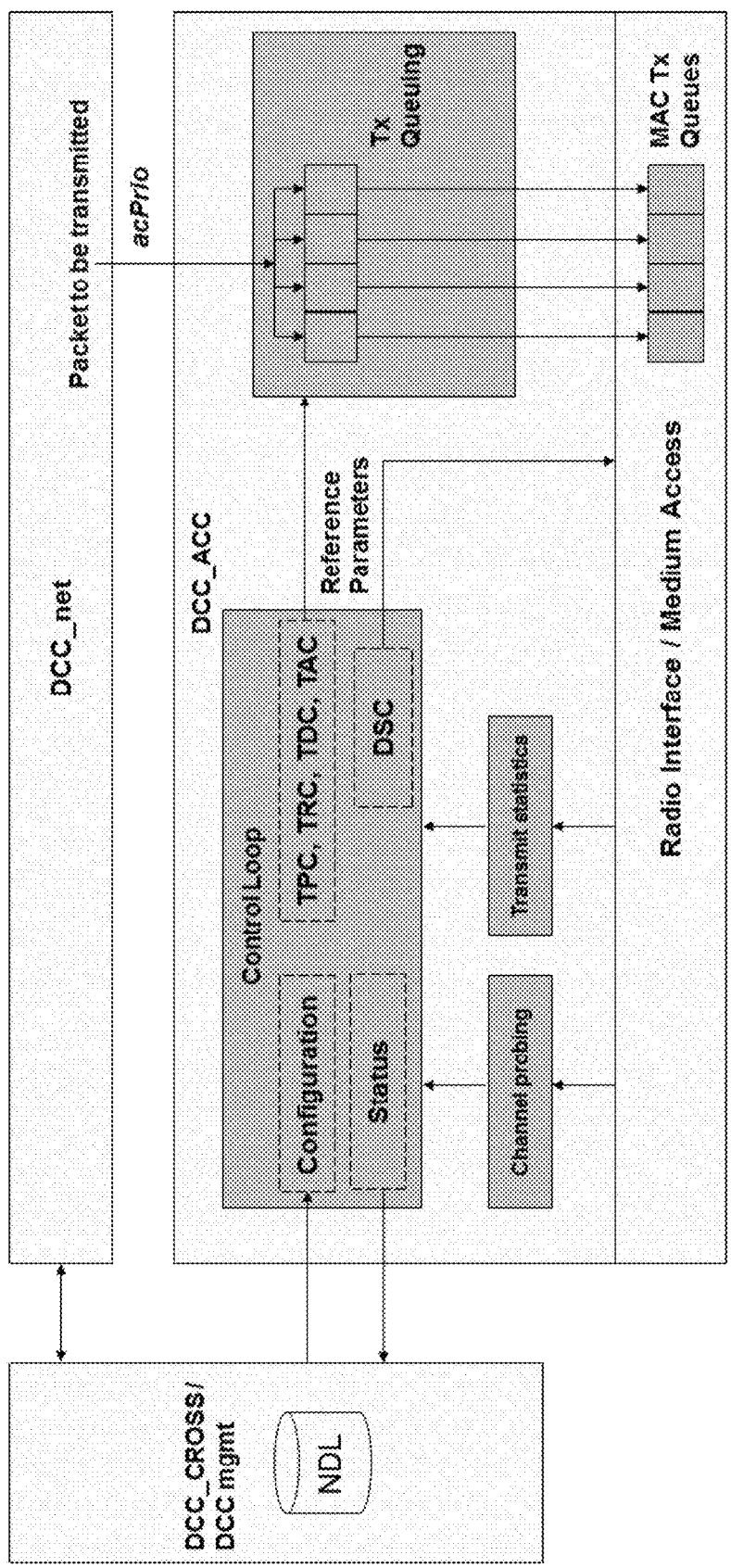
FIG. 5*a* shows a schematic diagram illustrating further details of the local congestion control scheme of FIG. 4 based on DSRC communication.

FIG. 5a shows the functional view of the DCC_ACC entity with the following building blocks: transmit queuing (Tx Queuing), which enhance the standard 802.11 queues by DCC mechanisms; channel probing to collect statistics on the communication channel; transmit statistics to observe the behavior of the own ITS station; control loop that adapt the behavior of the own ITS station to the actual channel load.

An operational requirement of DCC is to keep the actual channel load below predefined limits that are part of the Network Design Limits (NDL). NDLs can be used to configure DCC_ACC and stored in the NDL database that contains all relevant information used by DCC_ACC (i.e., configuration parameters, input parameters, output parameters, DCC status information as defined in ETSI ITS 102 687). The NDL database is part of DCC_CROSS (i.e., DCC_mgmt) where the management layer is responsible for maintaining the configuration parameters.

As defined in ETSI ITS 102 687, the NDL database can include: ranges of the controlled parameters (i.e., minimum and maximum values); design limits (i.e., default and target values of the controlled parameters); regulatory limits and device dependent parameters (e.g., maximum transmit power); model parameters (e.g., parameters of the transmit model, channel model and receive model); internal control loop parameters (e.g., signal level thresholds and time constants).

The controlled parameters and the measured parameters can be written to the NDL database, especially: reference values (i.e., average target value used by DCC_ACC transmit queuing for per packet control); channel load measures.

The DCC_ACC relies on measured values for the channel load (Channel probing) and on statistics about transmitted packets (Transmit statistics). The transmit statistics of DCC_ACC can take into account all packets that are transmitted, including packet repetitions, RTS, CTS and ACK packets. The control loop can manage reference parameters according to the DCC_ACC mechanisms TPC, TRC, TDC and DSC. The reference parameters are: Transmit Power Control (TPC)→Reference transmit power: NDL_refTxPower; Transmit Rate Control (TRC)→Reference packet interval: NDL_refPacketInterval; Transmit Datarate Control (TDC)→Reference datarate: NDL_refDatarate; DCC Sensitivity control (DSC)→Reference "Clear Channel Assessment for DCC" (D-CCA) sensitivity: NDL_refCarrierSense; Transmit Access Control (TAC)→Reference queue status: NDL_refQueue.

In an embodiment, packets are classified at network layer, which provides the access priority (acPrio) per packet. Additionally, each packet that arrives from the network layer can have a preset value of transmit power and data rate. The transmit queuing in DCC_ACC can assign the packets to the corresponding MAC transmit queue. Enqueuing a packet to the MAC transmit queue shall not occur more frequently than specified by TRC. On enqueuing a packet to its MAC transmit queue, the preset values can be compared with the current reference values of TPC, TRC and TDC and modified if necessary. The DSC reference parameter NDL_refCarrierSense can be used to control the Clear Channel Assessment (CCA).

In an embodiment, the transmit power control (TPC) is based on transmit power thresholds listed in the following table. The signal power thresholds depend on the selected channel from ITS-G5A or ITS-G5B and the selected transmit queue. These thresholds are part of the NDL and shall be maintained by DCC_CROSS.

| Transmit power thresholds | Definition |
| --- | --- |
| NDL_minTxPower | minimum transmit power |
| NDL_maxTxPower | maximum transmit power |
| NDL_defTxPower(acPrio) | default transmit power |
| NDL_refTxPower(acPrio) | reference transmit power |

On receipt of the packet from network layer, the packet can be assigned to the corresponding transmit queue defined by the per-MAC service data unit (MSDU) priority (acPrio). The preset per-MSDU value of effTxPower can be corrected according to the following relation:

effTxPower=MIN(NDL_refTxPower(acPrio),effTxPower)

In an embodiment, the Transmit Rate Control (TRC) is based on the packet timing thresholds listed in the following table. The packet timing thresholds depend on the selected channel from ITS-G5A or ITS-G5B and the selected transmit queue. Timing thresholds are divided into packet duration thresholds and packet interval thresholds.

| Packet timing thresholds | Definition |
| --- | --- |
| Packet duration thresholds: | |
| NDL_maxPacketDuration(acPrio) | maximum duration (air time) of a packet |
| Packet interval thresholds: | |
| NDL_minPacketInterval | minimum interval between packets |
| NDL_maxPacketInterval | maximum interval between packets |
| NDL_defPacketInterval(acPrio) | default interval between packets |
| NDL_refPacketInterval(acPrio) | reference interval between packets |

Ensuring the packet interval means that there shall be a time interval of at least NDL_refPacketInterval(acPrio) between the transmission start of the current packet (from queue acPrio) and the transmission start of the previous packet. The packet air time of a packet ($T_{AIR}$) can be derived from the packet length. On reception the packet from the network layer, the packet can be assigned to the corresponding transmit queue defined by the per-MSDU priority (acPrio). In case that $T_{AIR}$ exceeds NDL_maxPacketDuration the packet shall be dropped. If NDL_refPacketIntervalfacPrio)>0, the configured packet interval shall be ensured.

In an embodiment, the Transmit Datarate Control (TDC) is based on the datarate thresholds listed in the following table. The datarate thresholds depend on the selected channel from ITS-G5A or ITS-G5B and the selected priority.

| Packet datarate thresholds | Definition |
| --- | --- |
| NDL_minDatarate | minimum datarate |
| NDL_maxDatarate | maximum datarate |
| NDL_defDatarate(acPrio) | default datarate |
| NDL_refDatarate(acPrio) | reference datarate |

The transmit datarate (effTxDatarate) of a packet can be set on a per-MSDU basis. On reception the packet from the network layer, the packet can be assigned to the corresponding transmit queue defined by the per-MSDU priority (acPrio). The preset per-MSDU value effTxDatarate can be corrected according to the following relation:

effTxDatarate=MAX(NDL_refDatarate(acPrio),effTxDatarate)

In an embodiment, DCC Sensitivity Control (DSC) is based on the sensitivity thresholds listed in the following table. The sensitivity thresholds can be used to determine whether the transmitter is clear to send or not. They depend on the selected channel from ITS-G5A or ITS-G5B. The Clear Channel Assessment for DCC (D-CCA) shall indicate a busy channel during a reception of a packet with receive level greater than NDL_refCarrierSense. In case that the preamble portion was missed, the D-CCA shall hold the carrier sense signal busy for any signal above NDL_refCarrierSense.

| Receive signal thresholds | Definition |
| --- | --- |
| NDL_minCarrierSense | minimum D-CCA sensitivity |
| NDL_maxCarrierSense | maximum D-CCA sensitivity for DCC |
| NDL_defCarrierSense | default D-CCA sensitivity |
| NDL_refCarrierSense | reference D-CCA sensitivity |

DSC has an impact on CCA by applying the reference parameters NDL_refCarrierSense instead of the installed receiver sensitivity and the −65 dBm carrier sensing threshold. This modified version of CCA is called D-CCA. The receiver sensitivity is not modified, only the thresholds for CCA. This provides the same chance for channel access to ITS stations with high sensitive receivers. The transmitter is allowed to transmit, although a far distant transmitter might be active at the same time.

In an embodiment, transmit access control (TAC) is the DCC_ACC mechanism that supports the operational requirement of fair channel access. In case of high channel load, the TAC is more restrictive to ITS stations that transmit many packets. This is done using the DCC_ACC transmit queueing.

| Receive signal thresholds | Definition |
|---|---|
| NDL_numQueue | Number of transmit queues in DCC_ACC |
| NDL_refQueueStatus(acPrio) | Status of transmit queue |

The transmit queues are ordered according the priority such that the highest priority queue has a priority index q=0. The actual transmit statistics are compared with the statistics of the DCC transmit model.

If too many packets are sent with priority indexes less or equal q, the corresponding queue is marked as closed, i.e.:

NDL_refQueueStatus($q$)=CLOSED if txChannelUse($q$)≤NDL_tmChannelUse($q$)

otherwise the queue is OPEN, i.e.:

NDL_refQueueStatus($q$)=OPEN if txChannelUse($q$)<NDL_tmChannelUse($q$)

In an embodiment, the decentralized congestion control (DCC) scheme on the access layer is implemented on top of IEEE 802.11p (i.e., Dedicated Short Range Communications (DSRC)) technology to adapt different transmission parameters using a state machine, with three states that regulate transmission behaviors of the vehicle. DCC has three states: relaxed, active (multiple active sub-states can be defined) and restrictive. The state transitions occur based on comparison of actual channel load (i.e., Channel Busy Ratio (CBR)) measurements with pre-defined maximum and minimum channel load definitions. On the basis of the actual state of the DCC state machine, different transmitter (Tx) power levels, transmission rates and receiver (Rx) sensitivities can be applied by the vehicular user equipments 110.

In an embodiment, when a state is entered, the state output parameters are set as listed in the following table.

| State output parameter | Definition |
|---|---|
| NDL_refStateId | State identifier |
| NDL_refChannelLoad | applied channel load threshold |
| NDL_refDcc | applied DCC_ACC mechanism |
| NDL_refTxPower | applied TPC parameter |
| NDL_refPacketInterval | applied TRC parameter |
| NDL_refDatarate | applied TDC parameter |
| NDL_refCarrierSense | applied DSC parameter |

As already mentioned above, in an embodiment, different types of DCC mechanisms can run in the vehicular user equipment 110 locally. These mechanisms can be reactive or adaptive as explained in ETSI TR 101 612. The reactive approaches can work in different ways such as they may adjust the transmit rate or adjust DCC flow control filter to limit the contribution of a vehicle's packet to the channel load. The adaptive approaches can use binary control and linear control algorithms as explained in ETSI TR 101 612.

Enhanced Distributed Channel Access (EDCA) is the official name of one of the MAC algorithms in IEEE 802.11, which is used by IEEE 802.11p. It is the distributed coordination function (DCF) with inclusion of QoS, i.e. the Carrier Sense Multiple Access/Collision Avoidance (CSMA/CA) algorithm with the possibility to prioritize data traffic. In EDCA, every node maintain queues with different Arbitration InterFrame Space (AIFS) values and Contention Window (CW) sizes with the purpose of giving data traffic with a higher priority an increased probability to access the channel before data traffic with a lower priority. The resulting AIFS for different Access Categories (ACs) is calculated using the following formula:

AIFS[AC]=AIFSN[$N$]×aSlotTime+aSIFSTime where the AIFSN is the AIFS number, which is an integer, aSlotTime and the aSIFSTime (short interframe space) are fetched from the PHY in use.

The QoS facility in IEEE 802.11 defines eight different user priorities (UPs) and these are inherited from the ANSI/IEEE Std 802.1 D defining MAC bridges. The UPs are mapped to four different access categories (ACs), i.e. queues, within the QoS facility [ETSI EN 302 663].

| AC | $CW_{min}$ | $CW_{max}$ | AIFSN |
|---|---|---|---|
| AC_VO | (aCWmin + 1)/4 − 1 | (aCWmin + 1)/2 − 1 | 2 |
| AC_VI | (aCWmin + 1)/2 − 1 | aCWmin | 3 |
| AC_BE | aCWmin | aCWmax | 6 |
| AC_BK | aCWmin | aCWmax | 9 |

In the following table, the different parameter values needed to determine MAC specific functions for 10 MHz channels of the OFDM PHY layer are tabulated [IEEE 802.11-2012].

| Parameter | Value |
|---|---|
| aSlotTime | 13 μsec |
| aSIFSTime | 32 μsec |
| aCWmin | 15 |
| aCWmac | 1023 |

The scope of IEEE 1609.4 is the specification of medium access control (MAC) sublayer functions and services that support multi-channel wireless connectivity between IEEE 802.11 Wireless Access in Vehicular Environments (WAVE) devices. The MAC sublayer management entity (MLME) provides access to specific radio channels under direction from the WAVE Management Entity (WME), allowing higher layers to exchange data on a designated channel. Channel access options include continuous channel access, alternating access between two channels, and immediate channel access as specified below:

continuous access, which requires no channel coordination.

alternating access, which requires channel coordination. The WME may request alternating channel access by sending a pair of MLMEX-CHSTART req, one indicating a channel to access during time slot 0, and one indicating a channel to access during time slot 1.

immediate channel access, allows immediate communications access on a designated channel for an extended period without consideration for time slot boundaries. On receipt of an MLMEX-CHSTART.req indicating immediate access, the MLME provides access to the indicated Channel Number as follows.

Figure 5B:
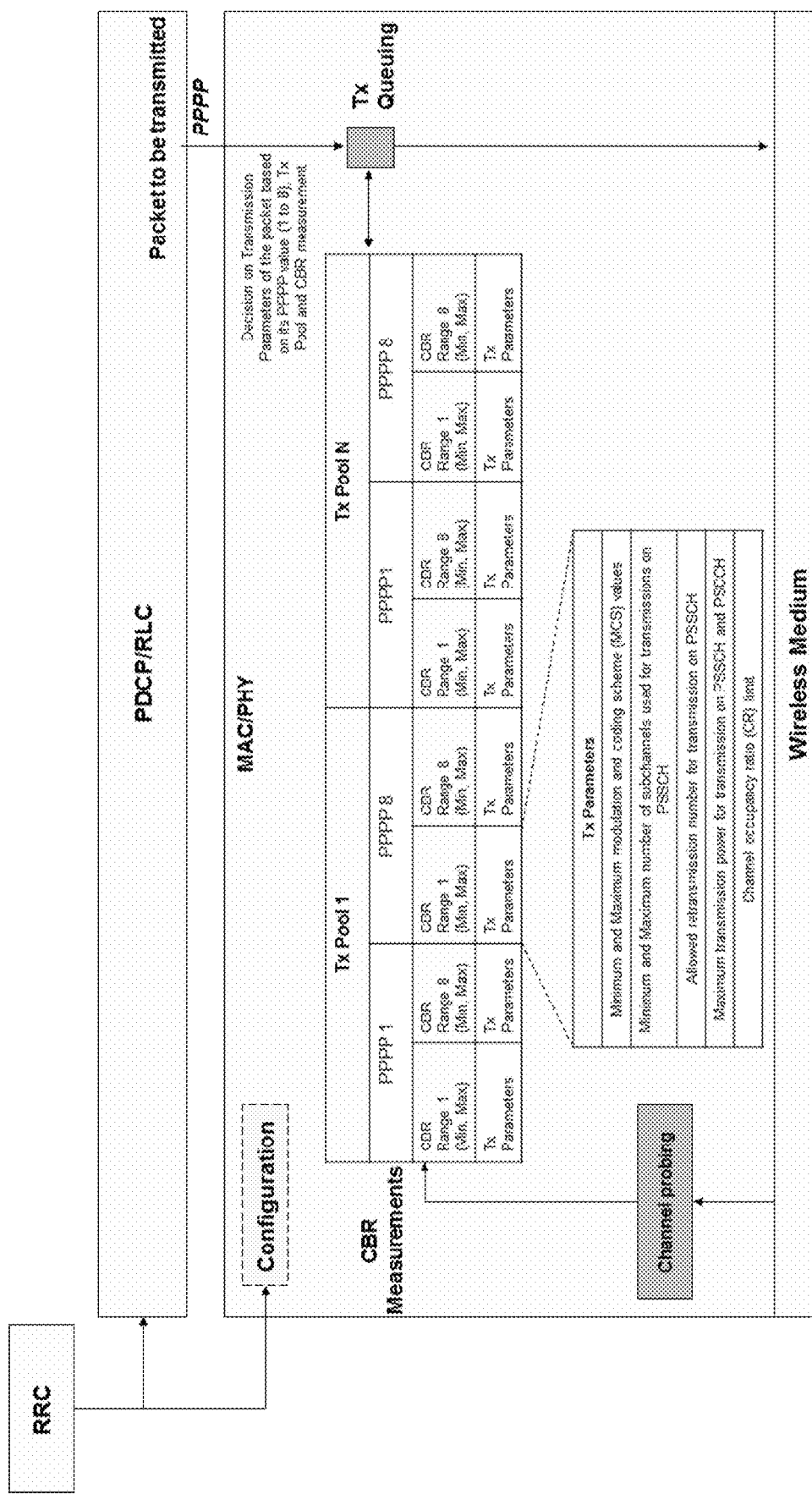
FIG. 5*b* shows a schematic diagram illustrating another example of the local congestion control scheme based on sidelink communication.

FIG. 5*b* shows the functional view of the congestion control entity of the 3GPP V2X sidelink communication with the following building blocks: transmit queuing (Tx Queuing); channel probing to collect statistics on the communication channel; control logic that adapts the transmission parameters of the packet waiting in the transmit queue based on the selected ProSe per packet priority (PPPP), the transmit pool (Tx Pool) and the measured CBR information.

As already described above, 3GPP V2X sidelink communication has also standardized a new congestion control mechanism. According to 3GPP TS 36.300, a vehicular user equipment 110 (regardless of its RRC state) performs transmission parameter adaptation based on the channel busy ratio (CBR). The transmission parameter adaptation applies to all transmission pools including an exceptional pool. The exemplary adapted transmission parameters can include: maximum transmission power (maxTxPower); a range of the number of retransmission per transport block (allowedRetxNumberPSSCH); a range of PSSCH RB number (minSubChannel-NumberPSSCH, maxSubchannel-NumberPSSCH); range of MCS (minMCS-PSSCH, maxMCS-PSSCH); a maximum limit on channel occupancy ratio (cr-Limit).

As already described above, in embodiments of the invention the global communication management entity 130 plays an important role in congestion control and interference control for the vehicular communication by using a centralized control mechanism. Such centralized control can be implemented as a single centralized cloud server or multiple distributed cloud servers. In case multiple distributed network nodes are used, it is also reasonable that these distributed servers can exchange information with each other to achieve better congestion and interference levels when vehicles are communicating.

By accurately estimating vehicle densities, in an embodiment, the global communication management entity 130 can predict Channel Busy Ratio (CBR) and Received Signal Strength Indication (RSSI), which in turn are used to control the V2X communication parameters of the vehicular user equipments 110. Alternatively, these type of information (CBR, RSSI) can be measured by the individual vehicular user equipments 110 and transmitted directly to the global communication management entity 130. Once the global communication management entity 130 has the CBR and/or RSSI information, it can make decisions on the transmission parameters of vehicles.

In an embodiment, the global communication management entity 130 can receive different types of information from different sources before making decisions on the V2X communication parameters of the vehicular user equipments 110. In addition to the respective motion state of the vehicular user equipments 110 this information can include: global traffic information of the streets and highways from traffic management centers (TMCs); road situation information (e.g., street with high buildings, sub-urban areas with low buildings, road lanes); knowledge of route information of the vehicular user equipments.

Figure 6:
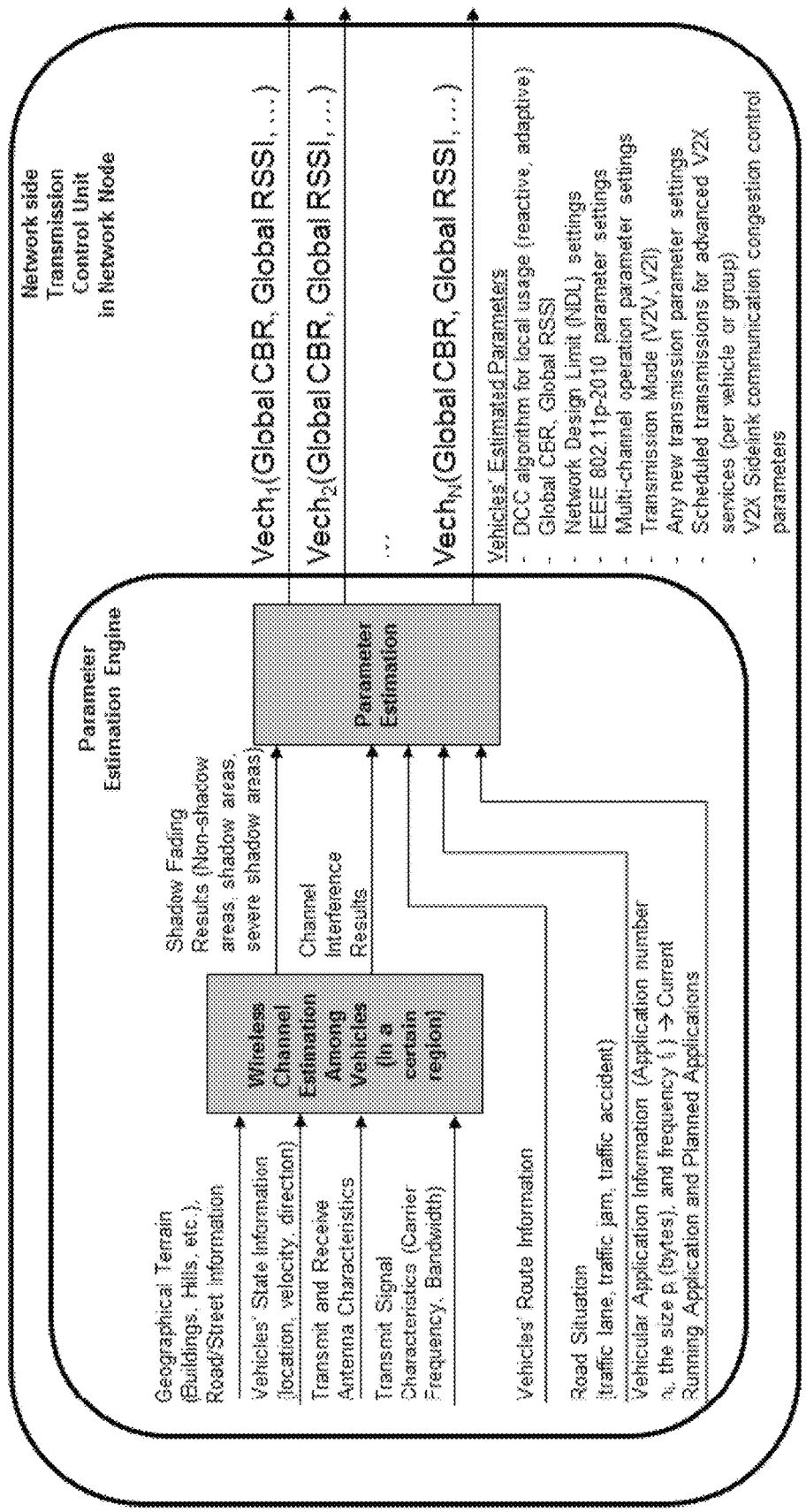
FIG. 6 shows a schematic diagram illustrating a parameter estimation engine implemented in a processor of a global communication management entity according to an embodiment.

As a result of such information sources, the global communication management entity 130 can make decisions on the V2X communication parameters of each vehicular user equipment 110 at different control levels as follows. In an embodiment, depending on the selected control level, different types of parameter settings can be provided by the global communication management entity 130 to each vehicular user equipment 110. The following list shows the possible sets of V2X communication parameters determined or adjusted by the global communication management entity 130:

1) Local DCC algorithm settings (reactive or adaptive).
2) Global CBR, Global RSSI settings.
3) DCC parameter settings (managed by DCC_CROSS Entity)
   Transmit power control parameters.
   Transmit rate control parameters.
   Transmit datarate control parameters.
   DCC sensitivity control parameters.
   Transmit access control parameters.
4) Network Design Limit (NDL) default value settings (managed by DCC_CROSS Entity).
5) IEEE 802.11p-2010 parameter settings (managed by IEEE 802.11p-2010).
6) Multi-channel operation parameter settings (managed of DCC_CROSS Entity).
7) New transmission parameters that are related to vehicular communication including new radio technologies that will be used for vehicular communication and new congestion control mechanism running on top of the new radio technologies.
8) The transmission mode (V2V or V2I) of vehicular communication.
9) Scheduled transmission parameters (describing radio resource allocation information) dedicated to single or a group of vehicles for advanced V2X services.
10) V2X Sidelink communication congestion control parameters In an embodiment illustrated in FIG. 6, when the global communication management entity 130 collects the required input parameters, it performs an estimation on the global CBR value and/or global RSSI together with NDL settings, IEEE 802.11p-2010 parameter settings, multi-channel operation parameters settings [IEEE 1609.4-2016] and transmission mode selection parameter for each vehicular user equipment 110. The global communication management entity 130 can also decide on the selected DCC algorithm. After the decision is completed, the global communication management entity 130 informs each vehicular user equipment 110 about any of the V2X communication parameters. The respective vehicular user equipment 110 uses the received global CBR value and/or global RSSI information as an input to its local DCC mechanism, uses the received NDL settings to update the NDL database, uses the received IEEE 802.11p-2010 parameter settings to update the IEEE 802.11p modem settings and uses the received multi-channel operation parameters settings to update WME and MLME settings. Furthermore, in the 3GPP V2X sidelink communication case, the network node updates the local congestion control parameters.

Figure 7:
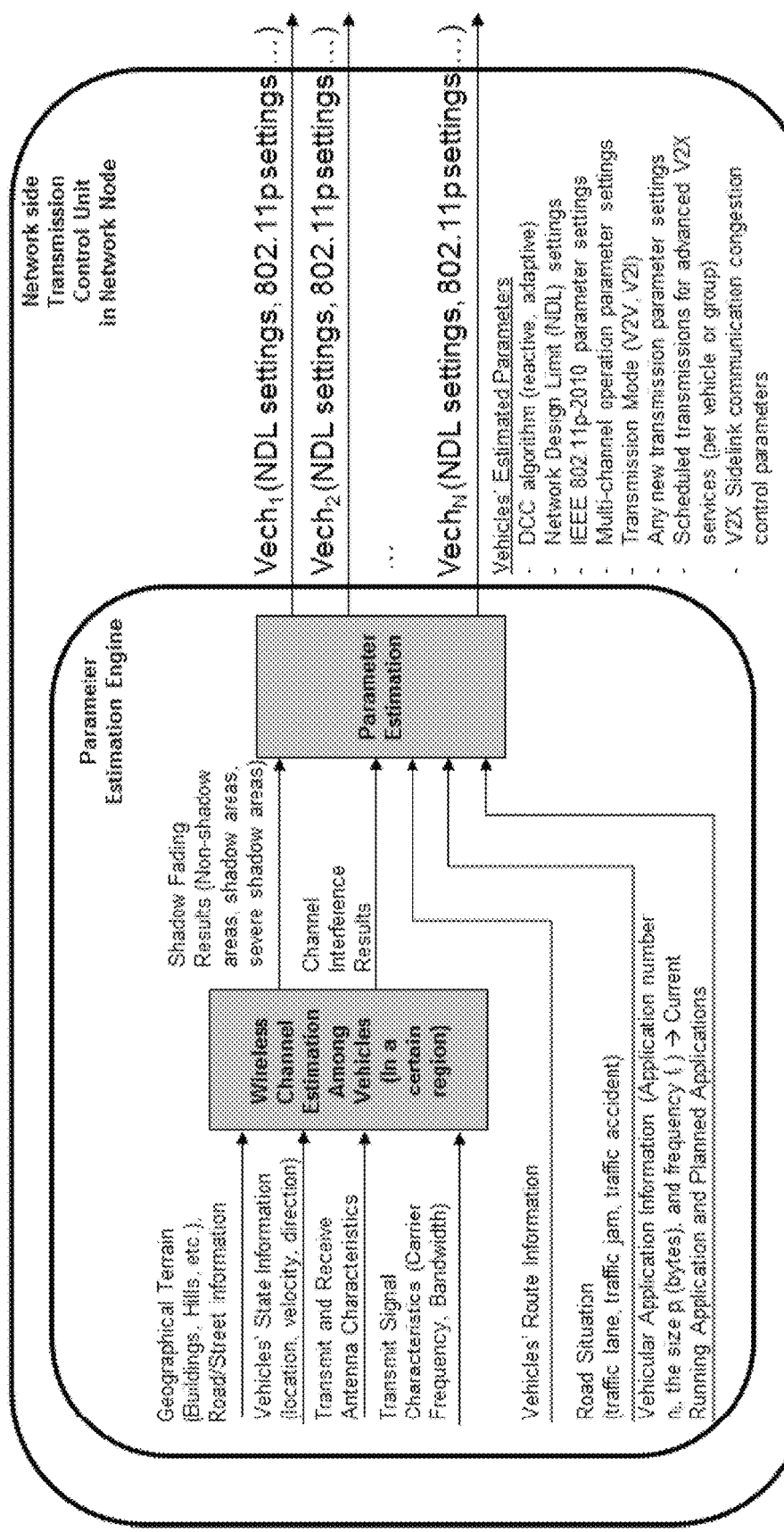
FIG. 7 shows a schematic diagram illustrating a parameter estimation engine implemented in a processor of a global communication management entity according to an embodiment.

In a further embodiment illustrated in FIG. 7, the global communication management entity 130 performs an estimation of the global CBR and/or global RSSI value for each vehicular user equipment 110 and calculates optimum NDL reference values for each vehicular user equipment 110 and informs the same about these NDL reference values. In this way, the global communication management entity 130 indirectly influences the outcome of the local DCC scheme implemented on the vehicular user interface 110, since the local DCC scheme changes its internal states based on the NDL reference values. Similar to the previous embodiment, additional estimation parameters can also be sent to the vehicular user equipment 110.

Figure 8:
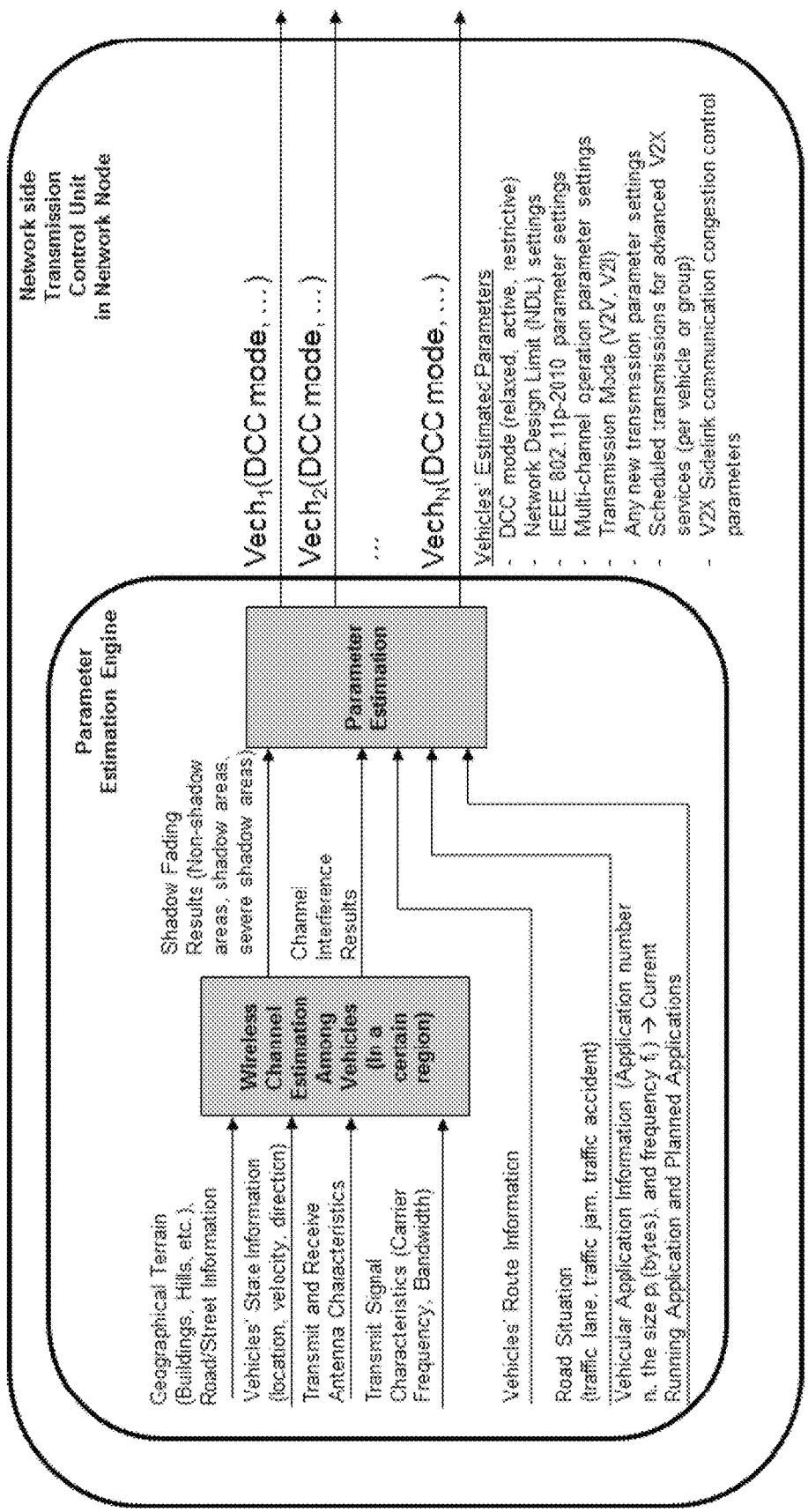
FIG. 8 shows a schematic diagram illustrating a parameter estimation engine implemented in a processor of a global communication management entity according to an embodiment.

In a further embodiment illustrated in FIG. 8, the global communication management entity 130 is configured to estimate a global CBR and/or global RSSI value for each vehicular user equipment 110 and to perform a global congestion control parameter evaluation on behalf of each individual vehicular user equipment 110 and inform each vehicular user equipment 110 about any of the V2X communication parameters related to DCC parameters, NDL settings, IEEE 802.11p-2010 parameter settings, multi-channel operation parameters settings [IEEE 1609.4-2016] and transmission mode selection parameters. In this embodiment, the local DCC scheme of each vehicular user equipment 110 can be deactivated and completely depend on the mode or state information (relaxed, active, restrictive) provided by the global communication management entity 130. Furthermore, in the 3GPP V2X sidelink communication case, the global communication management entity 130 updates the local congestion control parameters with a certain specific parameter list and lets the vehicular user equipment 110 use these specific parameters without checking the local CBR measurements.

The above embodiments are based on the estimation of a global CBR without any local CBR measurements provided by the vehicular user equipments 110. In a further embodiment, each vehicular user equipment 110 can be configured to transmit its own local CBR measurement results to the global communication management entity 130. In this case, the local CBR measurement can be also used as an additional input in the parameter estimation engine.

Figure 9:
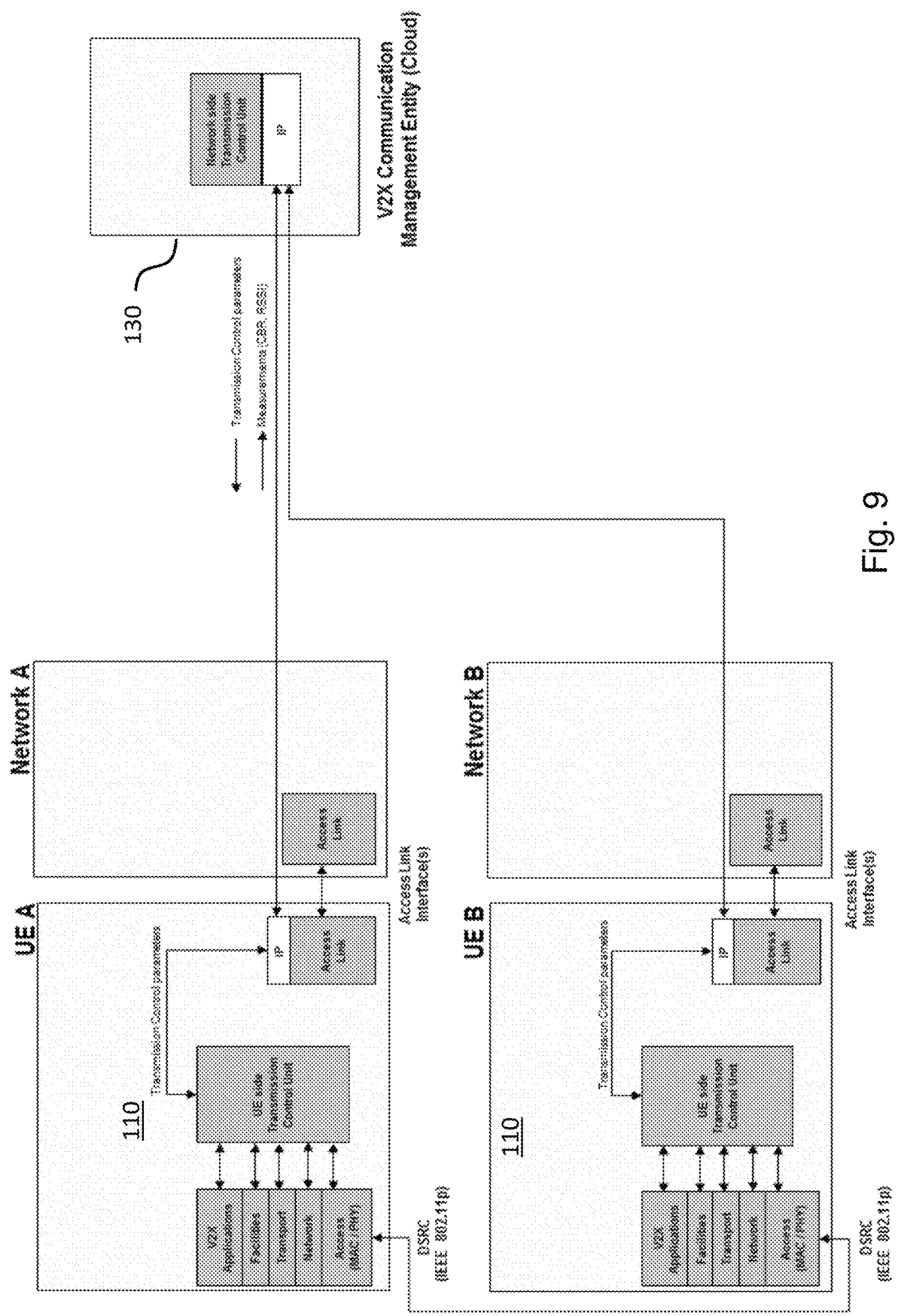
FIG. 9 shows a schematic diagram illustrating a V2X communication network comprising a global communication management entity and a plurality of vehicular user equipments configured to communicate via a DSRC technology with each other, according to an embodiment.

FIG. 9 shows an embodiment of the V2X communication network 100 based on IEEE 802.11p communication. The global communication management entity 130 can gather different types of information from the vehicular user equipments 110 and other sources (such as the RSUs 140 shown in FIG. 1) and can control V2X communication parameters of the vehicular user equipments 110 supporting IEEE 802.11p communication.

Figure 10:
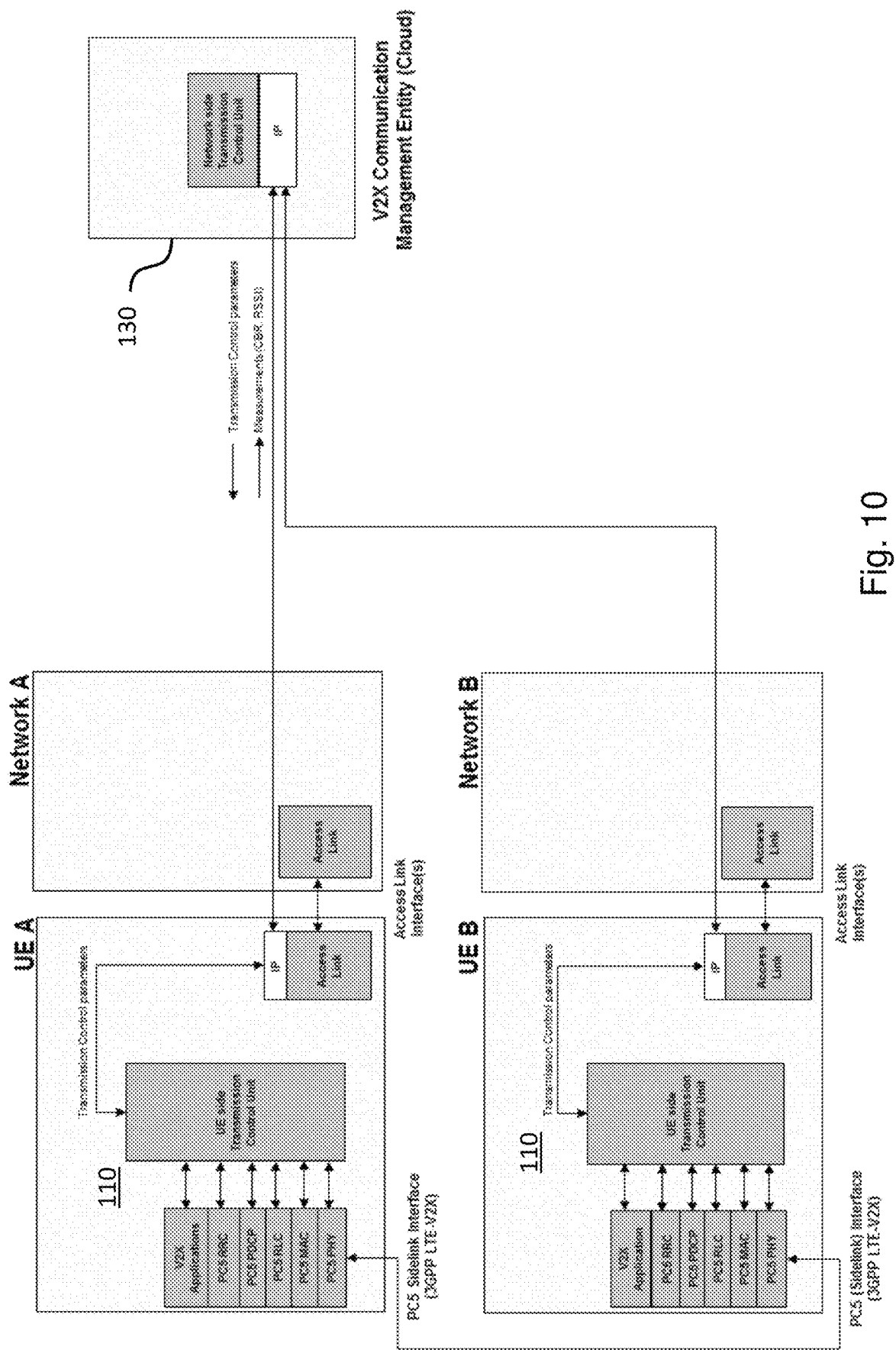
FIG. 10 shows a schematic diagram illustrating a V2X communication network comprising a global communication management entity and a plurality of vehicular user equipments configured to communicate via a sidelink communication technology with each other according to an embodiment.

FIG. 10 shows an embodiment of the V2X communication network 100 based on 3GPP V2X sidelink (PC5) communication. The global communication management entity 130 can gather different types of information from the vehicular user equipments 110 and other sources (such as the RSUs 140 shown in FIG. 1) and can control V2X communication parameters of the vehicular user equipments 110 supporting 3GPP V2X sidelink (PC5) communication.

As already described above, the global communication management entity 130 can utilize different sources of information, when it is performing the functionalities described above.

Figure 11:
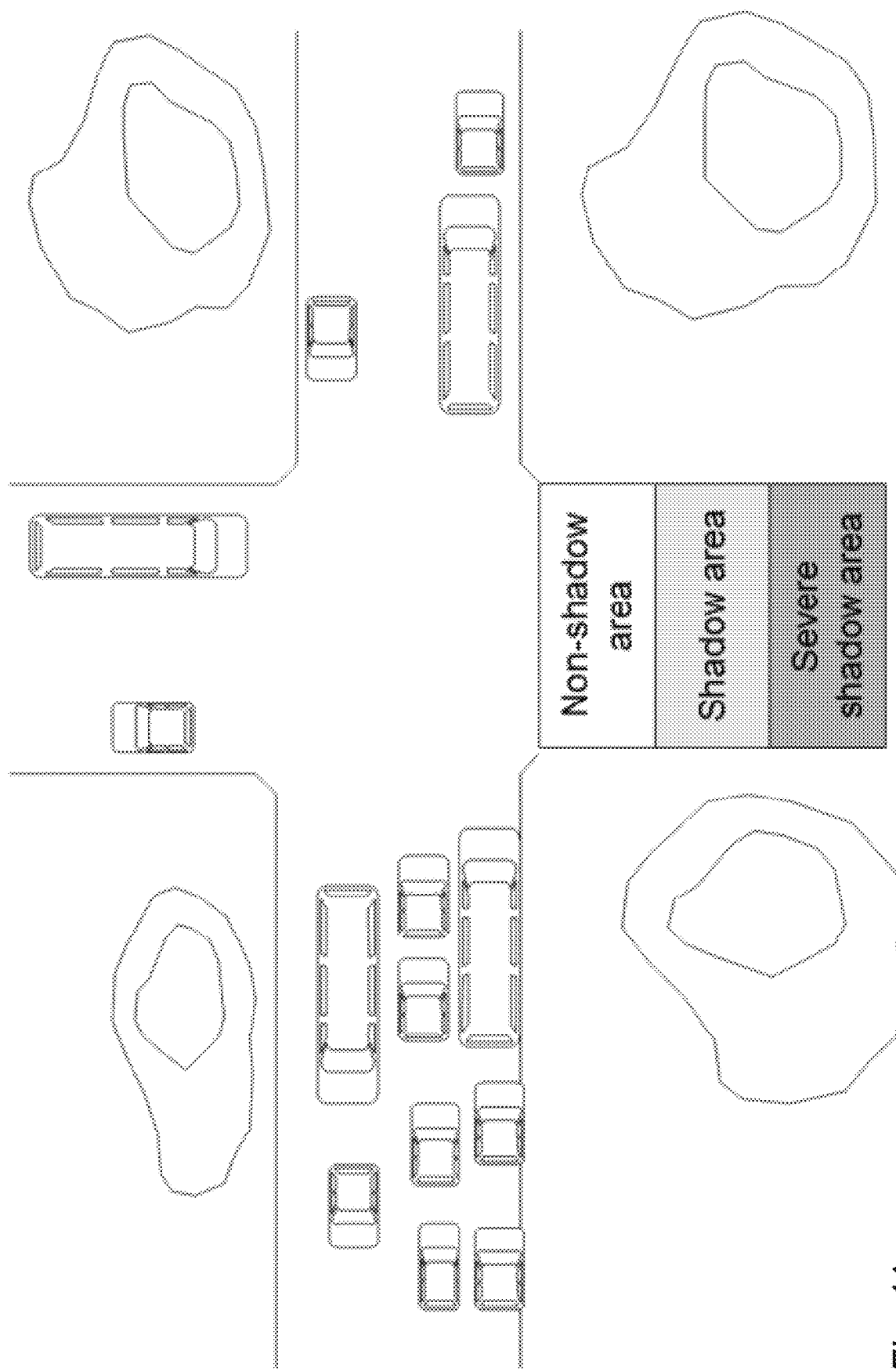
FIG. 11 shows a schematic diagram illustrating a global communication management entity taking into account the shadowing effect according to an embodiment.

In an embodiment, based on the channel estimation results (e.g., shadow detection results), the global communication management entity 130 can divide road sections into several types of shadow attenuation areas according to the shadow effect. FIG. 11 shows an example to illustrate this approach, where different roads can have different divisions. In a "non-shadow area" the communication between the vehicular user equipments 110 in this area and the vehicular user equipments 110 on the road will not be affected by the shadow effect of the roadside building. In a "shadow area" the communication between the vehicular user equipments 110 in this area and the vehicular user equipments 110 on the road will be slightly affected by the dynamic shadow of a large vehicle and the static shadow of the roadside buildings. In a "severe shadow area" the communication between the vehicular user equipments 110 in this area and the vehicular user equipments 110 on the road will be severely affected by the static shadow of the roadside buildings. In an embodiment, the global communication management entity 130 can use such information when it is evaluating the optimal communication mode (V2V or V2I), CBR and RSSI estimation of the vehicular user equipments 110.

Since vehicular safety messages are usually broadcasted on the control channel (CCH), a channel interference may occur outside the vehicular carrier sensing range. In an embodiment, the global communication management entity 130 can be configured to designate all or some vehicular user equipments 110 in different sections to measure the channel interference conditions and feedback their measurements to the global communication management entity 130. After receiving the channel interference conditions, the global communication management entity 130 can further predict the level of channel interference between the moving vehicular user equipments 110. On the basis of the following equation:

$$\delta = \frac{p_r}{\Sigma_K \frac{p_k}{d(x_K, y)^\alpha}}$$

where:

$\delta$ is the channel interference indicator $p_r$ is the average received power of a vehicle y in a sensing area K is the number of interference areas of the vehicle y $p_k$ is the average transmission power of a vehicle $x_k$ in the interference area k $d(x_K,y)$ is the distance between the vehicle $x_k$ and the vehicle y $\alpha$ is a channel attenuation factor $x_k$ and y are the center vehicles in each area.

In an embodiment, the global communication management entity 130 can use such information when it is evaluating the optimal communication mode (V2V or V2I), CBR and RSSI estimation of the vehicular user equipments 110.

In an embodiment, the global communication management entity 130 collects state information (i.e., location, speed, direction) of each vehicular user equipment 110 and their application information. The application information could be 1) currently active number of the applications and their characteristics (i.e., size of Protocol Data Units (PDUs) and the frequency of transmissions) and 2) other planned applications and their characteristics that the vehicular user equipment 110 wants to activate in the near future. The global communication management entity 130 can predict the current and near future global data traffic usage of the V2X communication network 100 and the vehicular density in a certain geographical region by using such information. Then, the global communication management entity 130 can utilize such information when it is predicting network load (i.e., CBR) and/or RSSI performance in a certain geographical region as an example usage.

The direction and density of the vehicular user equipments 110 running in different lanes can be different. Traffic jams and traffic accidents may increase the traffic density in different sections of the road. In an embodiment, the global communication management entity 130 (by the help of TMCs) can have a comprehensive analysis and utilize such information when it is predicting network load (i.e., CBR) and/or RSSI performance in a certain geographical region.

In an embodiment, knowledge of route information of the vehicular user equipments 110 can help the global communication management entity 130 to make better predictions of the network load (i.e., CBR) and/or RSSI performance based on the future positions of the vehicular user equipments 110 as an example usage. The following table lists input parameters that can be taken into account by the global communication management entity 130 according to an embodiment for determining the V2X communication parameters for the vehicular user equipments 110.

| The input parameters | Description |
| --- | --- |
| Wireless channel characteristics (e.g., shadow area) | Depending on the density of vehicles and the distance(s) between vehicles in each geographical region, the network node can predict the shadow areas. Geographical terrain information, transmit signal characteristics (e.g., carrier frequency, bandwidth) and antenna characteristics are also taken into account. According to the shadow effect, the road of intersection can be divided into different types of shadow attenuation areas as an example. |
| Wireless channel characteristics (e.g., the channel interference) | Depending on the density of vehicles and the distance(s) between vehicles in each geographical region, the network node can predict the channel interference. Geographical terrain information, transmit signal characteristics (e.g., carrier frequency, bandwidth) and antenna characteristics are also taken into account. |
| State information of vehicles (location, velocity, direction) and the vehicular application information | Depending on the vehicle position and the application information, the network node can have a better prediction of the network load (i.e., CBR) and/or RSSI performance. |
| Road Situation (traffic lane, traffic jam, traffic accident) | This information may include static road information such as number of lanes and also dynamic road information such as traffic jam and traffic accidents which may affect the vehicle density in different traffic lanes of the roads. |
| Vehicle route information | Knowledge of route information of vehicles can help the network node to make better predictions of the network load (i.e., CBR) and/or RSSI performance based on the future positions of vehicles. |
| Local CBR and RSSI measurements | Vehicles may send their local CBR and RSSI measurements to the network node. |
| Currently running and/or planned applications on the vehicle | Vehicles may inform which applications are currently running and which applications are planned to be used in the near future. The network node may use such information while predicting the network load and/or RSSI performance. |

As already described above, by means of an analysis of the input parameters, the global communication management entity 130 can predict different types of output parameters for the vehicular user equipments 110 (which in turn are used as V2X communication parameter settings for the vehicular user equipments 110). As already mentioned above, these parameters can include:

1) Local DCC algorithm settings (reactive or adaptive).
2) Global CBR, Global RSSI settings.
3) DCC parameter settings (managed by DCC_CROSS Entity)
    Transmit power control parameters.
    Transmit rate control parameters.
    Transmit datarate control parameters.
    DCC sensitivity control parameters.
    Transmit access control parameters.
4) Network Design Limit (NDL) default value settings (managed by DCC_CROSS Entity).
5) IEEE 802.11p-2010 parameter settings (managed by IEEE 802.11p-2010).
6) Multi-channel operation parameter settings (managed of DCC_CROSS Entity).
7) New transmission parameters that are related to vehicular communication including new radio technologies that will be used for vehicular communication and new congestion control mechanism running on top of the new radio technologies.
8) The transmission mode (V2V or V2I) of vehicular communication.
9) Scheduled transmission parameters (describing radio resource allocation information) dedicated to single or a group of vehicles for advanced V2X services.
10) V2X Sidelink communication congestion control parameters In an embodiment, the V2X communication parameters can include one or more of the DCC parameters listed in the following two tables.

| DCC Access Parameters | Parameter Name | Comment |
| --- | --- | --- |
| TPC Parameters | NDL_minTxPower<br>NDL_maxTxPower<br>NDL_defTxPower(acPrio)<br>NDL_refTxPower(acPrio) | The network node estimates and controls TPC parameters of the vehicles in different geographical regions. |
| TRC Parameters | NDL_maxPacketDuration(acPrio)<br>NDL_minPacketInterval<br>NDL_maxPacketInterval<br>NDL_defPacketInterval(acPrio)<br>NDL_refPacketInterval(acPrio) | The network node estimates and controls TRC parameters of the vehicles in different geographical regions. |
| TDC Parameters | NDL_minDatarate<br>NDL_maxDatarate<br>NDL_defDatarate(acPrio)<br>NDL_refDatarate(acPrio) | The network node estimates and controls TDC parameters of the vehicles in different geographical regions. |
| DSC Parameters | NDL_minCarrierSense<br>NDL_maxCarrierSense<br>NDL_defCarrierSense<br>NDL_refCarrierSense | The network node estimates and controls DSC parameters of the vehicles in different geographical regions. |

| DCC Access Parameters | Parameter Name | Comment |
|---|---|---|
| TAC Parameters | NDL_numQueue<br>NDL_refQueueStatus(acPrio)<br>NDL_queueLen(acPrio) | The network node estimates and controls TAC parameters of the vehicles in different geographical regions. |
| Receive model parameter | NDL_defDccSensitivity<br>NDL_maxCsRange<br>NDL_refPathloss<br>NDL_minSNR | The network node estimates and controls receive model parameters of the vehicles in different geographical regions. |
| Demodulation model parameter | NDL_snrBackoff(datarate) | The network node estimates and controls demodulation model parameter of the vehicles in different geographical regions. |
| Transmit model parameter | NDL_tmPacketArrivalRate(acPrio)<br>NDL_tmPacketAvgDuration(acPrio)<br>NDL_tmSignalAvgPower(acPrio)<br>NDL_maxChannelUse<br>NDL_tmChannelUse(acPrio) | The network node estimates and controls transmit model parameters of the vehicles in different geographical regions. |
| Channel load thresholds | NDL_minChannelLoad<br>NDL_maxChannelLoad | The network node estimates and controls channel load thresholds of the vehicles in different geographical regions. |
| Enhanced DCC parameters | NDL_excessThresholdDown<br>NDL_excessThresholdUp<br>NDL_upperRankThreshold<br>NDL_lowerRankThreshold | The network node estimates and controls enhanced DCC parameters of the vehicles in different geographical regions. |
| General configuration | NDL_timeUp<br>NDL_timeDown<br>NDL_numActiveState<br>NDL_curActiveState | The network node estimates and controls general configuration of control loop parameters of the vehicles in different geographical regions. |
| Active state configuration | NDL_asStateId<br>NDL_asTimeDn<br>NDL_asChanLoad<br>NDL_asDcc<br>NDL_asTxPower(acPrio)<br>NDL_asPacketInterval(acPrio)<br>NDL_asDatarate(acPrio)<br>NDL_asCarrierSense(acPrio) | The network node estimates and controls active state configuration of control loop parameters of the vehicles in different geographical regions. |

In an embodiment, the V2X communication parameters can include one or more of the IEEE 802.11p parameters listed in the following table.

| IEEE 802.11p Parameters | Parameter Name | Comment |
|---|---|---|
| QoS Mapping Parameters | user priorities (UPs) access categories (ACs) | Dynamic mapping of UPs to ACs. |
| Access Category (AC) Parameters | Cwmin<br>Cwmax<br>AIFSN | Dynamic update of Cwmin, Cwmax, AIFSN parameters per AC. |
| PHY specific Parameters | aSlotTime<br>aSIFSTime<br>aCwmin<br>aCwmax | Dynamic update aSlotTime, aSIFSTime, aCwmin, aCwmax parameters. |

In an embodiment, the V2X communication parameters can include one or more of the multi-channel operation parameters [IEEE 1609.4-2016] listed in the following table.

| IEEE 802.11p Parameters | Parameter Name | Comment |
|---|---|---|
| Multi-channel operation | Activate<br>De-activate | Multi-channel operation can be activated or de-activated in certain geographical regions. |
| Alternating channel access | timeslot 0<br>timeslot 1 | timeslot 0 and timeslot 1 durations in a sync interval can be dynamically updated in an alternating channel access case. |
| Immediate channel access | Immediate access | Designated channel for an extended period without consideration for time slot boundaries. |

Figure 12:
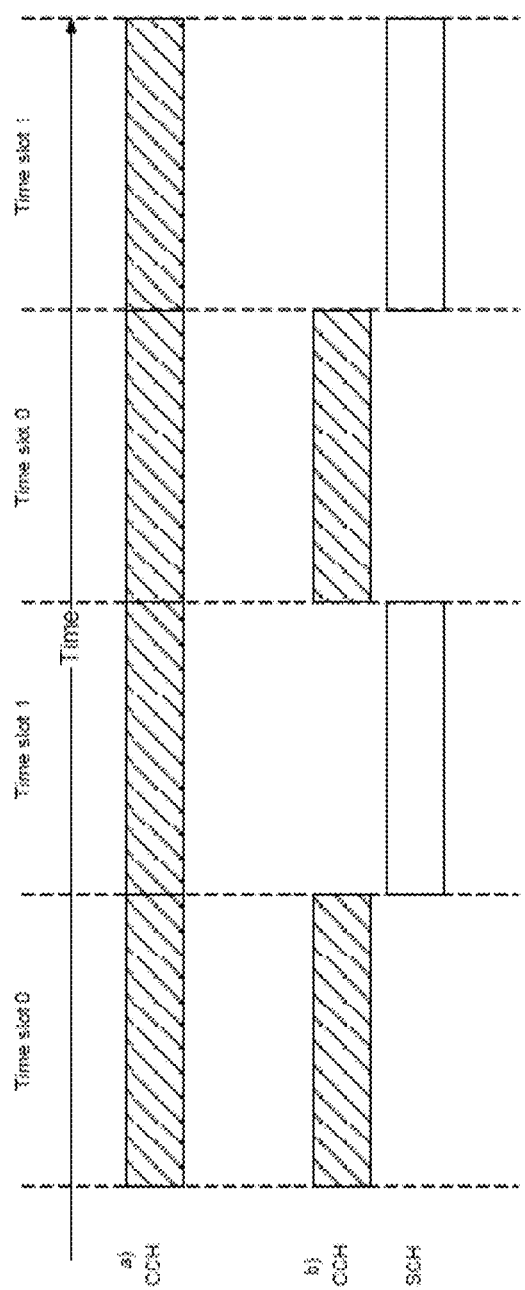
FIG. 12 shows a schematic diagram illustrating multi-channel access examples.

The multi-channel operation benefits of the global communication management entity 130 can be summarized as follows: arrangement of synchronization of service channel (SCH) and control channel (CCH) allocation times among vehicular user equipments 110 (i.e., time slot 0, time slot 1 shown in FIG. 12); decision on channel allocation times in the network 100 when alternating channel is enabled; coordinate/help immediate channel access needs of vehicular user equipments 110.

In the following, an exemplary use case for the global communication management entity 130 is described. In this example, the network node 130 controls the DCC, multi-channel operation and transmission mode (V2V, V2I) of a vehicular user equipment 110 by applying the centralized control (CC) algorithm illustrated in FIG. 13. The algorithm takes different number of input parameters as explained above and provides output parameters related to CBR and/or RSSI estimation, DCC parameters, multi-channel operation parameters and transmission mode (V2V, V2I) selection. The centralized control algorithm illustrated in FIG. 13 is divided into three parts.

Figure 14:
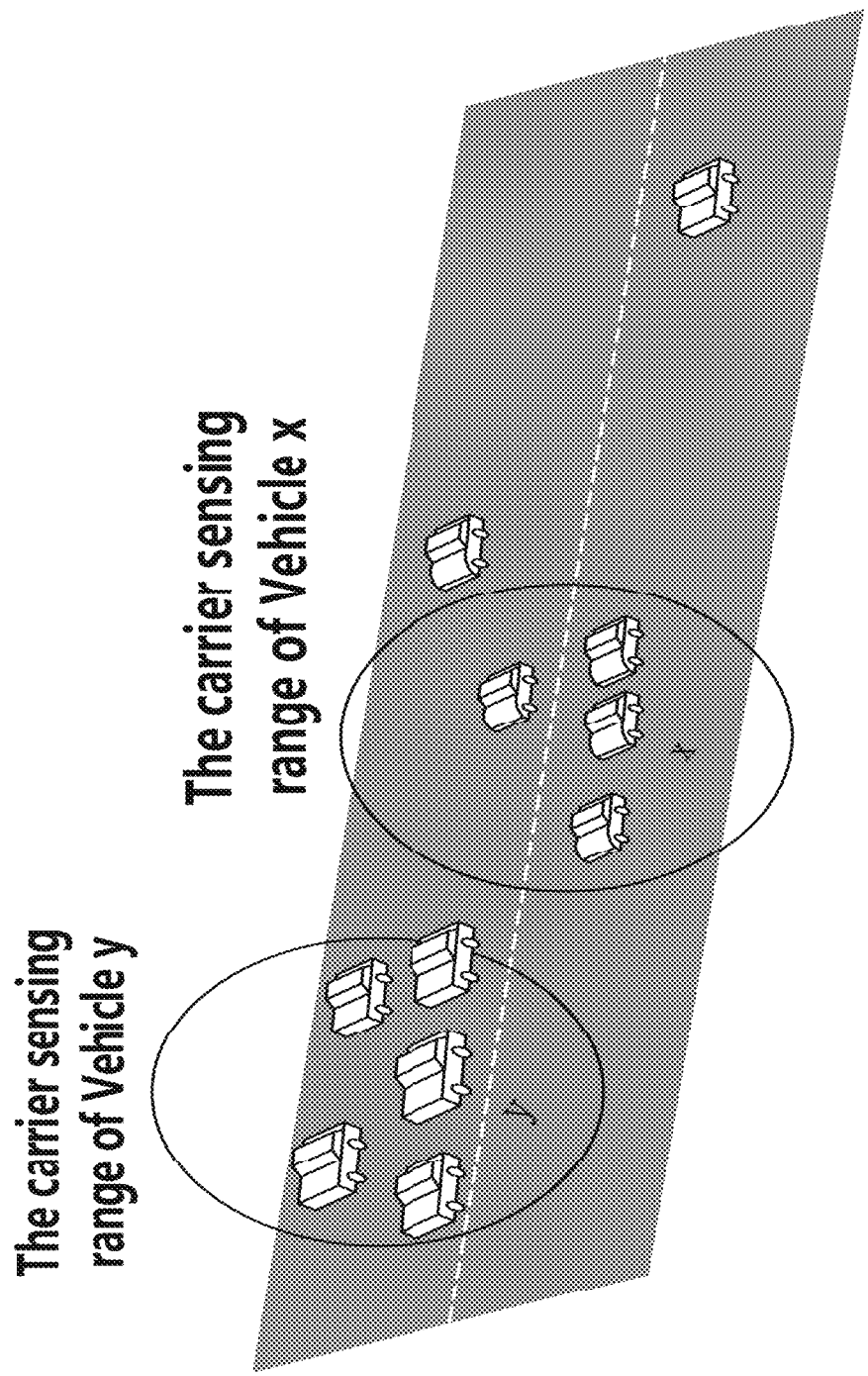
FIG. 14 shows a schematic diagram illustrating the respective carrier sensing ranges of vehicular user equipments according to an embodiment.
Figure 15:
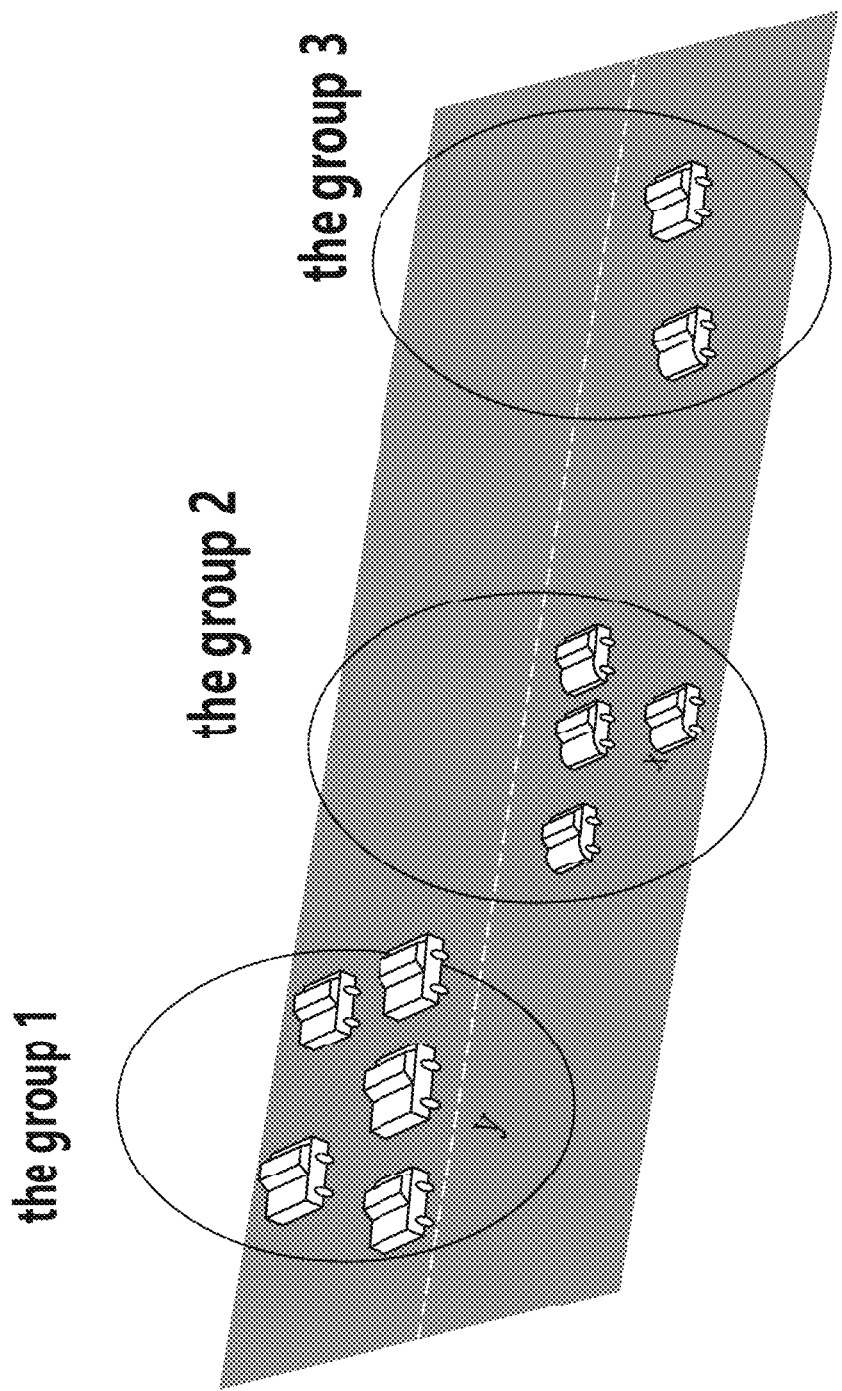
FIG. 15 shows a schematic diagram illustrating different groups of vehicular user equipments according to an embodiment.

Part 1: By using traffic and road information (e.g., vehicle density, number of lanes and location of vehicular user equipments 110), the network node 130 can partition the vehicles into different groups according to an intensive degree p and a carrier sense range as shown in FIGS. 14 and 15. When grouping is completed, the network node 130 provides estimated transmission parameters to each vehicular user equipment 110 in the group which is targeting to avoid excessive interference within the group transmissions (i.e., intra-group coordination). In addition, the network node 130 can assign different radio resource allocations to different groups in order to limit the interference between neighboring groups (i.e., inter-group coordination). When all vehicular user equipments 110 of a group use the same transmit power $p_t$ and carrier sense threshold $T_{cs}$, the carrier sense range L of every group can be described using the following equation:

$$L_{group\ i} = \left(\frac{p_t}{T_{cs}}\right)^{1/n}$$

where:

$L_{group\ i}$ is the carrier sense range L of a group i $T_{cs}$ is the carrier sense threshold of the group i $p_t$ is the transmission power of the group i n is a path attenuation factor (e.g., from 2 to 5).

Using the carrier sense range L, the network node 130 can predict the surrounding vehicle-intensive degree ρ of the j-th vehicular user equipment 110 on the basis of the following equation:

$$\rho_j(t) = \frac{m}{L}$$

where:

L is a carrier sense range L of a vehicle j m is the number of surrounding vehicles of the vehicle j in its carrier sense range L.

Part 2: The network node 130 evaluates CBR and the wireless channel state of the vehicular user equipment 110 in each group. With regard to the estimation of the CBR, the following equation is a classical equation to estimate the CBR of the j-th vehicular user equipment 110.

$$CBR_j = C \cdot \rho_j \cdot p_t \cdot r \cdot \tau / n$$

where:

C is a constant depending on the scene to determine the value $\rho_j$ is a surrounding vehicle intensive degree of vehicle j $p_t$ is the transmit power of the vehicle j r is a transmission rate which depends on the number of sent packets per unit time n is the path attenuation factor (e.g., from 2 to 5).

The network node 130 can use the different input parameters to determine the value of $CBR_j$. And the network node 130 can average the CBR of multiple vehicular user equipments 110 in each group to obtain the referential $CBR_{ref}$ of each group.

$$CBR_{ref\ i} = \frac{\sum_{j=1}^{k} CBR_j}{K}$$

where:

$CBR_{ref\ i}$ is the referential CBR of group i

K is the number of vehicles in group i $CBR_j$ is the CBR of vehicle j.

The physical interference model is defined as a node y successfully receiving the packet if and only if it receives the packet with a signal-to-interference-plus-noise ratio (SINR) greater than the SINR threshold.

if $\delta(t) \geq$ SINRthreshold, then the network node 130 does not need to perform interference control.

if $\delta(t) <$ SINRthreshold, then the network node 130 needs the interference control which needs to adjust the TPC, TDC, DSC parameters.

As already described in the context of FIG. 11, the network node 130 can divide road sections into several types of shadow attenuation areas according to the shadow effect.

In the non-shadow area, the network node 130 does not need to use shadowing control.

In the shadow area, the network node 130 should use the shadowing control which needs to adjust TRC parameter.

In the severe shadow area, the network node 130 should inform the vehicular user equipments 110 of this severe shadow area so that the vehicular user equipment 110 needs to choose the V2I communication mode to avoid the severe shadow effect.

Part 3: Based on the estimated $CBR_{ref}$, the network node 130 adjusts the DCC control parameters and multi-channel operation of the vehicular user equipments 110 in the corresponding spatial group. The following table is an example of the first step (i.e., default) output parameters including DCC parameters and multi-channel operation.

| Centralized Control Parameters | Relaxed | Active | Restrictive |
|---|---|---|---|
| TPCdefault | 33 dBm | 23 dBm | −10 dBm |
| TRCdefault | 0.04 s | 0.5 s | 1 s |
| TDCdefault | 3 Mbit/s | 6 Mbit/s | 12 Mbit/s |
| DSCdefault | −95 dBm | −85 dBm | −65 dBm |
| Multi-channel operation | de-active | de-active | de-active |

After the network node 130 determines the default output parameters according to the present evaluated $CBR_{ref}$, it checks whether a second step adaptation is needed based on wireless channel state information of the vehicular user equipments 110 (interference and shadow effect). The network node 130 can perform the following checks to consider the second step adaptation:

if estimated interference is less than a certain threshold (i.e., δ<SINRthreshold), the network node 130 should use the interference control which needs to adjust the TPC, TDC, DSC parameters. The vehicular user equipment 110 performs the backoff by reducing the carrier sense threshold to avoid further worsening the interference to the surrounding transmission. And the low datarate transmission can tolerate greater interference. Also, by reducing the transmit power, inter-group interference reduces.

when a group is located in the shadow area, then the network node 130 should use the shadowing control which needs to adjust the TRC parameter. By increasing the transmit rate (reduce the packet interval), the communication reliability will be improved.

Accordingly, in an embodiment, the following adaptation is performed in the default values of the first step.

$$TPC_{ref} = TPC_{default} + \Delta p$$

($\Delta p$ is a fluctuated value that is determined by the interference control)

$$TDC_{ref} = TDC_{default} + \Delta d$$

$\Delta d$ is a fluctuated value that is determined by the interference control $$DSC_{ref} = DSC_{default} + \Delta D$$

$\Delta D$ is a fluctuated value that is determined by the interference control $$TRC_{ref} = TRC_{default} + \Delta r$$

$\Delta r$ is a fluctuated value that is determined by the interference control

The operation of a Wireless Access in Vehicular Environments (WAVE) device to utilize more than one wireless channel is possible using channel coordination. Channel coordination allows a single-PHY device access to high priority data and manage traffic on the CCH during time slot 0, as well as general higher layer traffic on an SCH during the time slot 1. The ITS G5A band (5,875 GHz to 5,905 GHz) contains the channels CCH, SCH1 and SCH2. They are dedicated to road safety related services [ETSI 102 724]. ITSG5 uses a multi-channel mode, each device can switch between the control channel and a service channel, but the device cannot use two different channels at the same time. The evaluation of the multi-channel operation in the proposed algorithm can be as follows:

the network node 130 evaluates the CBR of SCH1 and SCH2, and chooses the minimum CBR channel.

when $CBR_{CCH} \geq 40\%$ and $CBR_{SCH} \leq 50\%$, then the network node 130 can activate the multi-channel operation in the corresponding area.

As the vehicular density is different in each group, the channel congestion may be increased when the density is high. The network node 130 can control the contention window (CW) to fit the current channel state. Due to the network node 130 can use the input parameters and the output parameters to determine the value of $CBR_{ref}$ of group i as shown in the equation above, different groups may have different CBRs. When the CBR of a group is increased compared to the last moment, the value of $CW_{min}$ and $CW_{max}$ can be adjusted by the network node 130. The following equation shows this scheme.

$$CW_{min} = \frac{CBR_{T_{i+1}}}{CBR_{T_i}} \cdot CW_{default\ min}$$

$$CW_{max} = \frac{CBR_{T_{i+1}}}{CBR_{T_i}} \cdot CW_{default\ max}$$

In addition to coordinating the transmission parameters of the vehicular user equipments 110 in a shared time/frequency plane (i.e., radio resource blocks in time and frequency domain) by above mentioned methods, the network node 110 can also assign dedicated time/frequency scheduled transmission opportunities which are used for advanced V2X services by the vehicular user equipments 110. The assigned dedicated time/frequency allocations can be orthogonal to the shared time/frequency allocations. Furthermore, the network node 130 can assign dedicated time/frequency allocations not only to a single vehicular user equipments 110 but also to a group of vehicular user equipments 110. When the radio resource blocks are assigned to a group of vehicular user equipments 110, the group of vehicular user equipments coordinates the individual usage of the assigned radio resource blocks.

It is also possible that new radio technologies that will be used for future vehicular communication may have new transmission parameters that are normally configured locally in the vehicular user equipment 110. According to embodiments of the invention, such new radio parameters used by the new radio technologies can be controlled by the network node 130.

As already described above, in an embodiment, the network node 130 is further configured to determine and update the local congestion control parameters of the 3GPP V2X sidelink (PC5) communication interface of a vehicular user equipment 110 for V2X sidelink communication. In this case, the IE SL-CBR-CommonTxConfigList which indicates the list of PSSCH transmission parameters (such as MCS, sub-channel number, retransmission number, CR limit) in sl-CBR-PSSCH-TxConfigList, and the list of CBR ranges in cbr-RangeCommonConfigList, to configure congestion control to the UE for V2X sidelink communication as specified in [3GPP TS 36.331] can be updated by the network node 130. sl-CBR-PSSCH-TxConfigList includes a list of SL-CBR-PSSCH-TxConfig which includes cr-Limit and tx-Parameters, and tx-Parameters includes the following parameters:

minMCS-PSSCH,
maxMCS-PSSCH,
minSubChannel-NumberPSSCH,
maxSubchannel-NumberPSSCH,
allowedRetxNumberPSSCH, and/or
maxTxPower.

In embodiments of the invention the global communication management entity 130 uses a centralized control (CC) algorithm: for selecting a local DCC algorithm (reactive or adaptive) to be used be the vehicular user equipment 110; for estimating the CBR and/or RSSI of an individual vehicular user equipment 110 or a group of vehicular user equipments 110 according to the vehicular density on the road; for adjusting the corresponding V2X transmission parameters of the vehicle to reduce the network congestion (this operation can include DCC parameter settings, NDL default value settings, IEEE 802.11p-2010 parameter settings, multi-channel operation settings); for selecting a transmission mode (V2V, V2I) for vehicular communication; for selecting any new transmission parameter of a new radio technology used for vehicular communication; for selecting radio resource allocations dedicated to a single or a group of vehicular user equipments 110, for determining and/or updating V2X sidelink communication congestion control parameters.

In an embodiment, the network node 130 provides centralized control functionality based on the different input parameters wherein, the input parameters can be:

CBR and/or RSSI measurements received from the vehicular user equipment 110, vehicle state information received from the vehicular user equipment 110, and/or transmit/receive antenna characteristics received from the vehicular user equipment 110, transmit signal characteristics received from the vehicular user equipment 110, currently running applications on the vehicle received from the vehicular user equipment 110, vehicle route information received from the vehicular user equipment 110, and/or road situation information received from TMCs.

The network node 130 can provide different output parameters (i.e., which are used as V2X communication parameter settings by the vehicular user equipments 110) which are transferred to individual vehicular user equipments 110, wherein the output parameters can include:

1) Local DCC algorithm settings (reactive or adaptive).
2) Global CBR, Global RSSI settings.
3) DCC parameter settings (managed by DCC_CROSS Entity)
   Transmit power control parameters.
   Transmit rate control parameters.
   Transmit datarate control parameters.
   DCC sensitivity control parameters.
   Transmit access control parameters.
4) Network Design Limit (NDL) default value settings (managed by DCC_CROSS Entity).
5) IEEE 802.11p-2010 parameter settings (managed by IEEE 802.11p-2010).
6) Multi-channel operation parameter settings (managed by DCC_CROSS Entity).
7) New transmission parameters that are related to vehicular communication including new radio technologies that will be used for vehicular communication and new congestion control mechanism running on top of the new radio technologies.
8) The transmission mode (V2V or V2I) of vehicular communication.
9) Scheduled transmission parameters (describing radio resource allocation information) dedicated to single or a group of vehicles for advanced V2X services, and/or
10) V2X Sidelink communication congestion control parameters.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A global communication management entity for managing vehicle-to-everything (V2X) communication parameters of a plurality of vehicular user equipments of a V2X communication network, comprising:
   at least one processor; and
   a memory configured to store computer readable instructions that, when executed by the at least one processor, cause the global communication management entity to provide execution comprising:
   determining one or more V2X communication parameters of a vehicular user equipment of the plurality of vehicular user equipments, wherein the one or more V2X communication parameters are associated with a local vehicle-to-vehicle (V2V) congestion control scheme implemented on the vehicular user equipment and/or a V2V communication module of the vehicular user equipment for communicating with the other vehicular user equipments; and
   providing the one or more V2X communication parameters to the vehicular user equipment,
   wherein the local V2V congestion control scheme implemented on the vehicular user equipment is operated in an active operation mode or an inactive operation mode, and wherein the at least one processor is configured to adjust an operation mode of the local V2V congestion control scheme implemented on the vehicular user equipment, and
   wherein the active operation mode is associated with a first set of V2X communication parameters and the inactive operation mode is associated with a second set of V2X communication parameters when a state machine of the local V2V congestion control scheme is deactivated.

2. The global communication management entity of claim 1, wherein the one or more V2X communication parameters of the vehicular user equipment are determined based on a motion state of the plurality of vehicular user equipments.

3. The global communication management entity of claim 2, wherein the motion state of the plurality of vehicular user equipments comprises one or more of the following for each of the plurality of vehicular user equipments:
   a location of the respective vehicular user equipment, a velocity of the respective vehicular user equipment, a motion direction of the respective vehicular user equipment, or a planned route of the respective vehicular user equipment.

4. The global communication management entity of claim 1, wherein the one or more V2X communication parameters are associated with a V2V communication module in the form of a dedicated short-range communications (DSRC) module and/or in the form of a sidelink communications module.

5. The global communication management entity of claim 4, wherein the V2X communication parameters further comprise: frequency and multi-channel operation parameters, channel access time parameters, scheduled transmission parameters, V2X communication mode selection parameters, and/or a message generation rate of an application belonging to a traffic class.

6. The global communication management entity of claim 1, wherein, when the computer readable instructions are executed by the at least one processor, the global communication management entity is further caused to provide execution comprising: managing infrastructure-to-vehicle (I2V) communication parameters of a plurality of roadside units (RSUs) of the V2X communication network, wherein one or more I2V communication parameters of a RSU of the plurality of RSUs are determined on the basis of a motion state of the plurality of vehicular user equipments.

7. The global communication management entity of claim 6, wherein the one or more I2V communication parameters comprise one or more of the following parameters of the RSU: frequency and multi-channel operation parameters, channel access time parameters, scheduled transmission parameters, I2V communication mode selection parameters, or a message generation rate of an application belonging to a traffic class.

8. The global communication management entity of claim 1, wherein the state machine of the local V2V congestion control scheme implemented on the vehicular user equipment defines a plurality of states, including an active state, and wherein, when the computer readable instructions are executed by the at least one processor, the global communication management entity is further caused to provide execution comprising: adjusting a state of the local V2V congestion control scheme implemented on the vehicular user equipment in the active operation mode.

9. The global communication management entity of claim 1, wherein the local V2V congestion control scheme implemented on the vehicular user equipment is a local decentralized congestion control (DCC) scheme, and wherein the one or more V2X communication parameters comprise a transmit power control (TPC), a transmit rate control (TRC), a transmit datarate control (TDC), a DCC sensitivity control (DSC), and/or a transmit access control (TAC).

10. The global communication management entity of claim 1, wherein the local V2V congestion control scheme implemented on the vehicular user equipment is a local decentralized congestion control (DCC) scheme, the local DCC scheme being a reactive local DCC scheme or an adaptive local DCC scheme.

11. The global communication management entity of claim 1, wherein the local V2V congestion control scheme implemented on the vehicular user equipment is a local sidelink communication congestion control scheme, the local sidelink communication congestion control scheme being a LTE-Vehicular (LTE-V) congestion control scheme, and wherein the one or more V2X communication parameters comprise a maximum transmission power, a range of the number of retransmissions per transport block, a range of a Physical Sidelink Shared Channel (PSSCH) resource block (RB) number, a modulation and coding scheme (MCS) range, and/or a maximum limit on a channel occupancy ratio.

12. The global communication management entity of claim 1, wherein the one or more V2X communication parameters comprise a global channel busy ratio (CBR), and/or a global received signal strength indication (RSSI) associated with the V2V communication module and Wherein, when the computer readable instructions are executed by the at least one processor, the global communication management entity is further caused to provide execution comprising providing the global CBR and/or the global RSSI to the vehicular user equipment.

13. The global communication management entity of claim 1, wherein the vehicular user equipment is configured to determine a local channel busy ratio (CBR) and/or a local received signal strength indication (RSSI) associated with the V2V communication module and to adjust the one or more V2X communication parameters of the vehicular user equipment on the basis of the determined local CBR and/or the determined local RSSI.

14. The global communication management entity of claim 1, wherein, when the computer readable instructions are executed by the at least one processor, the global communication management entity is further caused to provide execution comprising:

receiving from each of the plurality of vehicular user equipments a respective local channel busy ratio (CBR) and/or a respective local received signal strength indication (RSSI) associated with a respective V2V communication module of the respective vehicular user equipment, and determining the one or more V2X communication parameters of the vehicular user equipment on the basis of the local CBRs and/or the local RSSIs associated with the corresponding V2V communication modules of the plurality of vehicular user equipments.

15. A vehicle-to-everything (V2X) communication network comprising a plurality of vehicular user equipments and a global communication management entity for managing V2X communication parameters of the plurality of vehicular user equipments, the global communication management entity comprising:

at least one processor; and a memory configured to store computer readable instructions that, when executed by the at least one processor, cause the global communication management entity to provide execution comprising:

determining one or more V2X communication parameters of a vehicular user equipment of the plurality of vehicular user equipment, wherein the one or more V2X communication parameters are associated with a local vehicle-to-vehicle (V2V) congestion control scheme implemented on the vehicular user equipment and/or a V2V communication module of the vehicular user equipment for communicating with the other vehicular user equipments; and providing the one or more V2X communication parameters to the vehicular user equipment, wherein the local V2V congestion control scheme implemented on the vehicular user equipment is operated in an active operation mode or an inactive operation mode, and wherein the at least one processor is configured to adjust an operation mode of the local V2V congestion control scheme implemented on the vehicular user equipment, and wherein the active operation mode is associated with a first set of V2X communication parameters and the inactive operation mode is associated with a second set of V2X communication parameters when a state machine of the local V2V congestion control scheme is deactivated.

16. The V2X communication network of claim 15, wherein the V2X communication network further comprises a plurality of road side units (RSUs) and wherein the global communication management entity is configured to manage infrastructure-to-vehicle (I2V) communication parameters of the plurality of RSUs.

17. The V2X communication network of claim 15, wherein the global communication management entity is implemented on one or more cloud servers of the V2X communication network.

18. A vehicular user equipment of a vehicle-to-everything (V2X) communication network, comprising:
at least one processor; and
a memory configured to store computer readable instructions that, when executed by the at least one processor, cause the vehicular user equipment to provide execution comprising:
implementing a local vehicle-to-vehicle (V2V) congestion control scheme;
communicating with other vehicular user equipment of the V2X communication network;
communicating with a global communication management entity; and
receiving from the global communication management entity one or more V2X communication parameters, wherein the one or more V2X communication parameters are associated with the local V2V congestion control scheme implemented on the vehicular user equipment and/or a V2V communication module of the vehicular user equipment for communicating with the other vehicular user equipments, wherein the local V2V congestion control scheme implemented on the vehicular user equipment is operated in an active operation mode or an inactive operation mode, and wherein global communication management entity is configured to adjust an operation mode of the local V2V congestion control scheme implemented on the vehicular user equipment, and wherein the active operation mode is associated with a first set of V2X communication parameters and the inactive operation mode is associated with a second set of V2X communication parameters when a state machine of the local V2V congestion control scheme is deactivated.

* * * * *

UNITED STATES PATENT AND TRADEMARK OFFICE
CERTIFICATE OF CORRECTION

PATENT NO. : 11,438,792 B2  
APPLICATION NO. : 16/928146  
DATED : September 6, 2022  
INVENTOR(S) : Chan Zhou et al.

Page 1 of 1

It is certified that error appears in the above-identified patent and that said Letters Patent is hereby corrected as shown below:

In the Specification

• Column 3, Line 20, change "(12V)" to "(I2V)";

• Column 3, Line 23, change "12V" to "I2V";

• Column 3, Line 28, change "12V" to "I2V";

• Column 3, Line 33, change "12V" to "I2V";

• Column 3, Line 35, change "[ET&TS 103 141]" to "[ETSI TS 103 141]";

• Column 4, Line 66, change "12V" to "I2V";

• Column 8, Line 43, change "(12V)" to "(I2V)";

• Column 8, Line 47, change "12V" to "I2V";

• Column 8, Line 51, change "12V" to "I2V";

• Column 8, Line 57, change "12V" to "I2V"; and

• Column 10, Line 18, change "12V" to "I2V".

Signed and Sealed this  
Eleventh Day of October, 2022

Katherine Kelly Vidal  
*Director of the United States Patent and Trademark Office*